US012663268B2

(12) United States Patent
Vincent

(10) Patent No.: US 12,663,268 B2
(45) Date of Patent: Jun. 23, 2026

(54) SYSTEMS AND METHODS FOR GENERATING ROUTES FOR WATERCRAFT

(71) Applicant: Navico, Inc., Tulsa, OK (US)

(72) Inventor: Zachary E. Vincent, Claremore, OK (US)

(73) Assignee: Navico, Inc., Tulsa, OK (US)

( * ) Notice: Subject to any disclaimer, the term of this patent is extended or adjusted under 35 U.S.C. 154(b) by 410 days.

(21) Appl. No.: 18/351,053

(22) Filed: Jul. 12, 2023

(65) Prior Publication Data

US 2025/0020471 A1    Jan. 16, 2025

(51) Int. Cl.
| | |
|---|---|
| *G01C 21/20* | (2006.01) |
| *B63B 34/00* | (2020.01) |
| *B63B 49/00* | (2006.01) |
| *G01S 15/96* | (2006.01) |
| *G08G 3/02* | (2006.01) |

(52) U.S. Cl.
CPC ............ *G01C 21/203* (2013.01); *B63B 34/05* (2020.02); *B63B 49/00* (2013.01); *B63B 2201/18* (2013.01); *G01C 21/20* (2013.01); *G01S 15/96* (2013.01); *G08G 3/02* (2013.01)

(58) Field of Classification Search
CPC ..... B63B 34/05; B63B 2201/18; B63B 49/00; G01C 21/203; G01C 21/20; G08G 3/02; G01S 15/96
USPC ........................................................ 701/301
See application file for complete search history.

(56) References Cited

U.S. PATENT DOCUMENTS

| | | | |
|---|---|---|---|
| 5,525,081 A | 6/1996 | Mardesich et al. | |
| 6,249,742 B1 * | 6/2001 | Friederich .......... | G01C 21/3878 |
| | | | 701/428 |
| 7,209,829 B2 | 4/2007 | Litvack et al. | |

(Continued)

FOREIGN PATENT DOCUMENTS

| | | |
|---|---|---|
| AU | 2005289968 A1 | 4/2006 |
| AU | 2014375084 B2 | 7/2015 |

(Continued)

OTHER PUBLICATIONS

Find right depth to catch fish through ice by ETV News (Year: 2016).*

(Continued)

*Primary Examiner* — Cuong H Nguyen
(74) *Attorney, Agent, or Firm* — Nelson Mullins Riley & Scarborough LLP

(57) ABSTRACT

Example systems and methods are provided herein for generating paths for watercraft. Such systems include a memory and a processor, and the processor is configured to determine a set of condition parameters that each correspond to desired conditions for a potential navigation path, select at least one condition parameter from the set of condition parameters, and then determine and apply a constraint relaxation to the selected condition parameter(s) to form constraint relaxed condition parameter(s), each of which increases a range of input values that satisfy the corresponding desired conditions for the potential navigation path. The processor is also configured to determine a region based on an updated set of condition parameters, including the constraint relaxed condition parameter, and then to determine a navigation path within the region.

23 Claims, 25 Drawing Sheets

(56) References Cited

U.S. PATENT DOCUMENTS

| | | | |
|---|---|---|---|
| 7,268,703 | B1 | 9/2007 | Kabel et al. |
| 7,818,120 | B2 | 10/2010 | Poreda et al. |
| 8,296,001 | B1 | 10/2012 | Kabel et al. |
| 8,463,458 | B2 | 6/2013 | Wood et al. |
| 8,463,470 | B2 | 6/2013 | Wood et al. |
| 8,510,046 | B2 | 8/2013 | Kabel et al. |
| 8,543,269 | B1 | 9/2013 | Wood et al. |
| 8,577,525 | B2 | 11/2013 | Wood et al. |
| 8,606,432 | B1 | 12/2013 | Wood et al. |
| 8,645,012 | B2 | 2/2014 | Salmon et al. |
| 8,717,847 | B2 | 5/2014 | Blake |
| 9,086,278 | B2 | 7/2015 | Carnevali |
| 9,267,804 | B1 | 2/2016 | Steward et al. |
| 9,405,445 | B2 | 8/2016 | Carnevali |
| 9,423,258 | B2 | 8/2016 | Kabel et al. |
| 9,423,259 | B2 | 8/2016 | Kabel et al. |
| 9,851,206 | B2 | 12/2017 | Kabel et al. |
| 9,909,891 | B2 | 3/2018 | Langford-Wood |
| 9,945,673 | B2 | 4/2018 | Carnevali |
| 10,179,633 | B2 | 1/2019 | Carnevali |
| 10,290,124 | B2 | 5/2019 | Steward |
| 10,460,484 | B2 | 10/2019 | Hovland et al. |
| 10,473,781 | B2 | 11/2019 | Wiegers |
| 10,948,577 | B2 * | 3/2021 | Snyder .................... G01S 15/86 |
| 11,008,077 | B2 * | 5/2021 | Bailey .................. G01C 21/203 |
| 11,022,441 | B2 | 6/2021 | Clark et al. |
| 11,674,806 | B2 * | 6/2023 | Tulgara ................... G01S 15/89 |
| | | | 701/431 |
| 11,904,996 | B2 * | 2/2024 | Derginer ............. G05D 1/0875 |
| 2006/0064242 | A1 | 3/2006 | Litvack et al. |
| 2006/0089794 | A1 * | 4/2006 | DePasqua ........... G01C 21/203 |
| | | | 701/532 |
| 2006/0191185 | A1 | 8/2006 | Hansen |
| 2008/0133131 | A1 | 6/2008 | Poreda et al. |
| 2009/0287409 | A1 | 11/2009 | Summers |
| 2011/0054784 | A1 | 3/2011 | Wood et al. |
| 2011/0313655 | A1 | 12/2011 | Litvack et al. |
| 2012/0232719 | A1 | 9/2012 | Salmon et al. |
| 2013/0242700 | A1 | 9/2013 | Blake |
| 2014/0200806 | A1 | 7/2014 | Carnevali |
| 2015/0051836 | A1 | 2/2015 | Langford-wood |
| 2015/0226575 | A1 | 8/2015 | Rambo |
| 2015/0369610 | A1 | 12/2015 | Konig et al. |
| 2016/0153785 | A1 | 6/2016 | Steward et al. |
| 2017/0227362 | A1 | 8/2017 | Pryszo et al. |
| 2017/0370724 | A1 | 12/2017 | Hovland et al. |
| 2018/0059230 | A1 * | 3/2018 | Snyder ................... G06K 17/00 |
| 2018/0129213 | A1 | 5/2018 | Pelin et al. |
| 2020/0049507 | A1 | 2/2020 | Clark et al. |
| 2020/0326711 | A1 | 10/2020 | Rimmer |
| 2021/0371065 | A1 | 12/2021 | Dokken et al. |
| 2022/0011428 | A1 * | 1/2022 | Brandon ................. G01S 7/539 |
| 2022/0063787 | A1 * | 3/2022 | Derginer ............... B63H 20/12 |
| 2022/0268585 | A1 * | 8/2022 | Tulgara ................ G01C 21/203 |
| 2022/0315178 | A1 | 10/2022 | Hunt |
| 2024/0246643 | A1 * | 7/2024 | Crawford ............ A01K 97/125 |

FOREIGN PATENT DOCUMENTS

| | | | | |
|---|---|---|---|---|
| AU | 2013365921 B2 | | 4/2018 | |
| CA | 2 580 920 A1 | | 4/2006 | |
| CA | 2 777 338 A1 | | 11/2012 | |
| CA | 2 895 403 A1 | | 6/2014 | |
| CA | 2 933 304 A1 | | 7/2015 | |
| CA | 3 144 378 A1 | | 7/2015 | |
| CN | 107093202 A | * | 8/2017 | ............. G06T 17/20 |
| CN | 107093203 A | * | 8/2017 | ............. G06T 17/20 |
| CN | 107103639 A | * | 8/2017 | ............. G06T 15/20 |
| CN | 107123155 A | * | 9/2017 | ............. G06T 17/20 |
| CN | 113720342 A | * | 11/2021 | ......... G01C 21/3446 |
| CN | 112393728 B | * | 5/2022 | ............. G01C 21/20 |
| CN | 114902017 A | * | 8/2022 | ......... G01C 21/3407 |
| EP | 1 794 547 A2 | | 6/2007 | |
| EP | 3 027 501 A1 | | 6/2016 | |
| EP | 3 090 234 A2 | | 11/2016 | |
| JP | 2016-528548 A | | 9/2016 | |
| JP | 2022-187893 A | | 12/2022 | |
| KR | 2019 0117996 A | | 10/2019 | |
| SE | 543985 C2 | * | 10/2021 | ............. G01C 21/00 |
| WO | WO 2006/036561 A2 | | 4/2006 | |
| WO | WO 2008/067151 A2 | | 6/2008 | |
| WO | WO 2014/096960 A2 | | 6/2014 | |
| WO | WO 2015/011871 A1 | | 1/2015 | |
| WO | WO 2015/017800 A1 | | 2/2015 | |
| WO | WO 2015/101834 A2 | | 7/2015 | |

OTHER PUBLICATIONS

Hu, Yijun, et al. "Three-dimensional marine ranching cage inspection path planning integrating the differential evolution and particle swarm optimization algorithms." IEEE Access 11 (2023): 109747-109763. (Year: 2023).*

Granado Domínguez, Igor. "Solving fishing routing problems with metaheuristics." Universidad dei Pais Vasco, PHD Thesis (2023). (Year: 2023).*

Ferreira, Martha Dais, et al. "A semi-supervised methodology for fishing activity detection using the geometry behind the trajectory of multiple vessels." Sensors 22.16 (2022): 6063. (Year: 2022).*

Automatic Follow-Up of Contour Lines; Max Sea; retrieved May 15, 2020 from http://comen.maxsea.fr/MaxSea/Products/Features/AutomaticFollow-upContourlines/Default.aspx.

Basso; "Finding the Right Depth is Key to Catching Fish Through the Ice;" Dec. 27, 2013; retrieved Oct. 14, 2020 from https://etvnews.com/finding-the-right-depth-is-key-to-catching-fish-through-the-ice/.

"Is A* the best pathfinding algorithm ?;" Stack Overflow; Mar. 1, 2013; retrieved Jul. 12, 2023 from https://stackoverflow.com/questions/9511118/is-a-the-best-pathfinding-algorithm.

* cited by examiner

Flexible Conditions: 212

214

Weather condition

216

Tide condition

218

Depth condition (e.g., tied to fish type or fishing style)

220

Criticality 222

Non-flexible Conditions: 224

226

Minimum depth in which watercraft can travel

228

Maximum turn angle of watercraft

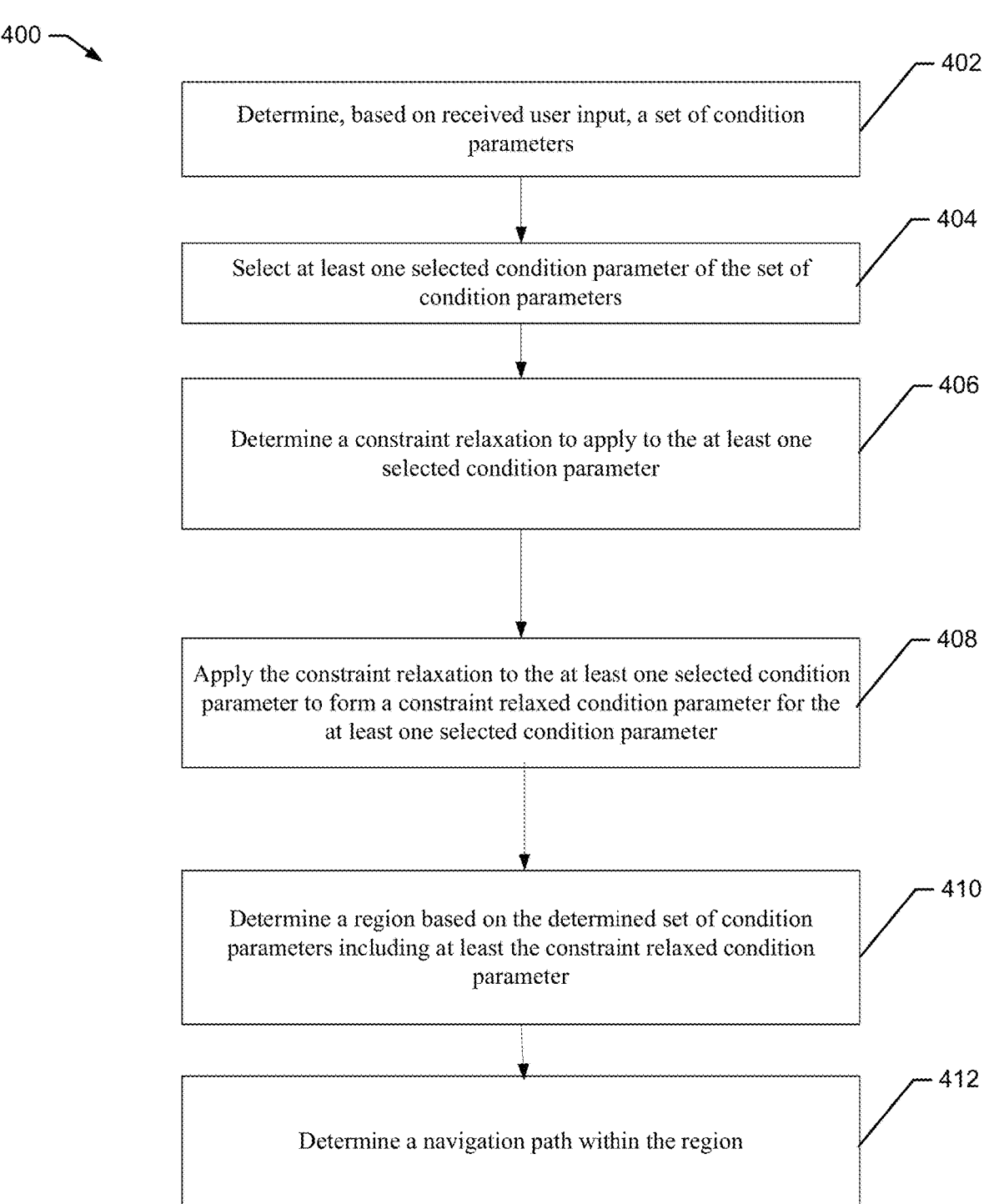

400

402
Determine, based on received user input, a set of condition parameters

404
Select at least one selected condition parameter of the set of condition parameters 406
Determine a constraint relaxation to apply to the at least one selected condition parameter 408
Apply the constraint relaxation to the at least one selected condition parameter to form a constraint relaxed condition parameter for the at least one selected condition parameter 410
Determine a region based on the determined set of condition parameters including at least the constraint relaxed condition parameter 412
Determine a navigation path within the region

FIG. 24

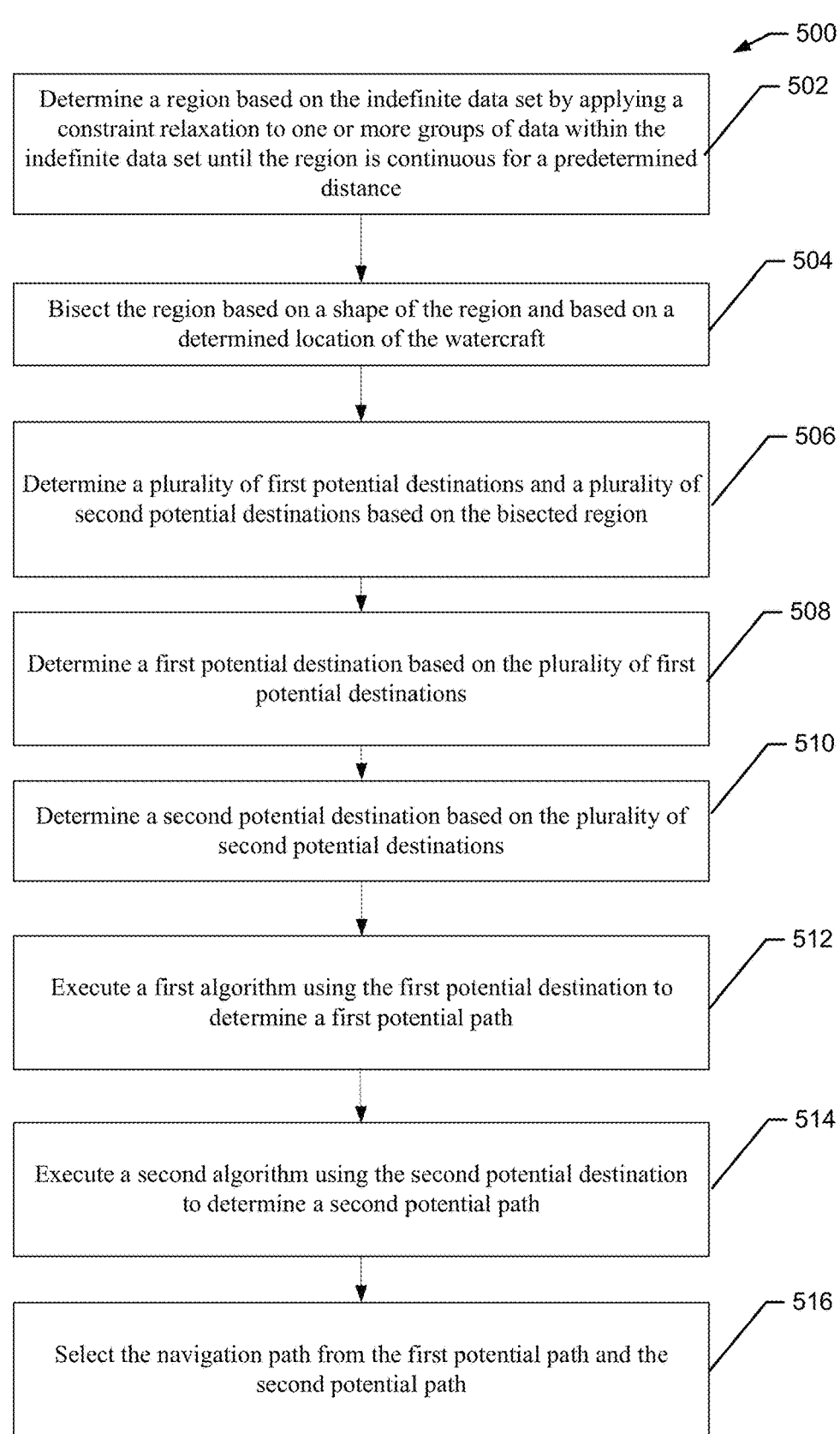

500

Determine a region based on the indefinite data set by applying a constraint relaxation to one or more groups of data within the indefinite data set until the region is continuous for a predetermined distance — 502

Bisect the region based on a shape of the region and based on a determined location of the watercraft — 504

Determine a plurality of first potential destinations and a plurality of second potential destinations based on the bisected region — 506

Determine a first potential destination based on the plurality of first potential destinations — 508

Determine a second potential destination based on the plurality of second potential destinations — 510

Execute a first algorithm using the first potential destination to determine a first potential path — 512

Execute a second algorithm using the second potential destination to determine a second potential path — 514

Select the navigation path from the first potential path and the second potential path — 516

*FIG. 25*

SYSTEMS AND METHODS FOR GENERATING ROUTES FOR WATERCRAFT

FIELD OF THE INVENTION

Example embodiments of the present invention generally relate to watercrafts and, more particularly to, systems and methods for generating routes for watercraft based on indefinite data.

BACKGROUND

Watercraft often contain autopilot navigation systems that are configured to help a user navigate a waterway while the user completes other tasks. Such autopilot navigation systems are useful in controlling the watercraft through known waterways and/or navigating to a pre-selected destination. While such autopilot navigation systems are useful in helping a user navigate to a pre-selected destination, however, users sometimes need an autopilot navigation system to operate a watercraft within a waterway continuously without having a destination selected. In such situations, users often decide to disengage the autopilot navigation system and manually operate the watercraft relative to certain parameters. It would be desirable to provide for improvements in such situations.

BRIEF SUMMARY

Current systems have difficulty generating routes for a watercraft based on parameters that define an indefinite data set because the systems require a pre-selected destination in order to generate a route. However, continuous route generation would be useful in situations in which a user needs to remain within certain parameters but in which the final destination of the watercraft is not important, such as may be the case for fishing or other activities. Accordingly, some example embodiments of the present invention include systems and methods for generating routes for watercrafts based on indefinite data. As noted above, many watercraft have autopilot navigation systems that help navigate the watercraft through a waterway and/or to a pre-selected destination. However, a user may wish to generate a continuous route for the watercraft based on desired parameters that include indefinite data rather than based on a pre-selected destination. For example, a user may desire to fish while a watercraft is at a depth that is within a certain range, such as while the watercraft is moving within a preferred range of speeds. In such an example, the final destination of the watercraft may be unimportant to the user. This may be useful, for example, so that the watercraft may maintain a speed within the preferred range in areas of the waterway that are within the preferred depth range even when there may be multiple routes in which the speed and depth ranges may be satisfied.

In some embodiments, various systems and methods described herein may even be able to provide such route formation when there are no routes in which the preferred speed and/or depth ranges may be satisfied. Such example embodiments may be beneficial in determining and applying a constraint relaxation to at least one condition parameter such as to account for situations in which there are no routes in which the preferred conditions may be satisfied. Further, such example embodiments may be beneficial in continuously bisecting determined regions and determining potential destinations so that navigation algorithms can be used.

Additional benefits are also contemplated and will become apparent to one of ordinary skill in the art in view of this disclosure.

Some example systems include a processor and a memory, and the processor may be configured to receive user input and determine a set of condition parameters that each correspond to desired conditions for a potential navigation route. The received user input may or may not include the desired conditions. For example, the user input may indicate a fishing style, and the processor may then use the desired fishing style to determine a preferred depth range. Alternatively, the received user input may directly indicate a preferred depth range, among other things. The processor may then select at least one of the condition parameters and then determine and apply a constraint relaxation to the selected condition parameter. The constraint relaxation may increase a range of input values of the selected condition parameter that satisfy the corresponding desired conditions for the potential navigation route. The processor may then determine a region based on the full set of condition parameters, which includes the constraint relaxed condition parameter, and then determine a navigation path. The determination of the navigation path may include a continuous process of bisecting the region, determining potential destinations, executing navigation algorithms, and selecting the navigation path from determined potential paths.

In an example embodiment, a system for creating a navigation path for a watercraft is provided. The system includes a processor and a memory including computer executable instructions, and the computer executable instructions are configured to, when executed by the processor, cause the processor to determine, based on received user input, a set of condition parameters including at least a first condition parameter and a second condition parameter. Each of the condition parameters correspond to desired conditions for a potential navigation path. The processor is further configured to select at least one condition parameter of the set of condition parameters and determine a constraint relaxation to apply to the at least one selected condition parameter. The constraint relaxation increases a range of input values of the at least one selected condition parameter that satisfy the corresponding desired conditions for the potential navigation path. The processor is further configured to apply the constraint relaxation to the at least one selected condition parameter to form a constraint relaxed condition parameter for the at least one selected condition parameter and determine a region based on an updated determined set of condition parameters including at least the constraint relaxed condition parameter. Each location within the region satisfies the updated determined set of condition parameters. The processor is further configured to determine the navigation path within the region.

In some embodiments, determining the navigation path may include bisecting the region based on a shape of the region and based on a determined location of the watercraft, determining a plurality of first potential destinations and a plurality of second potential destinations based on the bisected region, determining a first potential destination based on the plurality of first potential destinations, and determining a second potential destination based on the plurality of second potential destinations.

In some embodiments, determining the navigation path may further include executing a first algorithm using the first potential destination to determine a first potential path where each part of the first potential path is within the determined region, executing a second algorithm using the second potential destination to determine a second potential path where each part of the second potential path is within the determined region, and selecting the navigation path from among the first potential path and the second potential path.

In some embodiments, the first algorithm and the second algorithm may be A*algorithms.

In some embodiments, the first algorithm and the second algorithm may be RRT algorithms.

In some embodiments, the first algorithm and the second algorithm may be D*algorithms.

In some embodiments, selecting the navigation path from among the first potential path and the second potential path may include determining which of the first potential path and the second potential path provides a greatest distance solution corresponding to a location within the region that is furthest from the determined location of the watercraft.

In some embodiments, determining the set of condition parameters may be based on at least one of the received user input, environmental data, activity data, or vessel data.

In some embodiments, the user input may indicate a desired mode, and the processor may be further configured to determine at least one of the first condition parameter or the second condition parameter based on the desired mode.

In some embodiments, the desired mode may correspond to at least one of a desired fish type or a desired fishing style.

In some embodiments, the navigation path may be a continuous path.

In some embodiments, the continuous path may be formed by determining a subsequent navigation path prior to completion of the prior navigation path by the watercraft.

In some embodiments, the continuous path may be repeatedly updated in accordance with predetermined intervals.

In some embodiments, the predetermined intervals may be based on at least one of a period of time or a distance.

In some embodiments, selecting the at least one condition parameter may include ranking the set of condition parameters based on criticality.

In some embodiments, selecting the at least one condition parameter may include selecting a group of the set of condition parameters based on the group having flexibility.

In some embodiments, determining the constraint relaxation may include determining the constraint relaxation for the group of the set of condition parameters in order of the ranking based on criticality.

In some embodiments, the set of condition parameters may include data received from a network.

In some embodiments, the set of condition parameters may include at least one of a depth minimum of the watercraft, a minimum turn radius of the watercraft, a weather condition, a tide condition, sensor data, GPS data, sonar data, radar data, marine data, or a territorial condition received from AIS.

In some embodiments, the processor may be located within a marine electronic device on the watercraft.

In some embodiments, the processor may be further configured to cause an autopilot navigation assembly to travel along the navigation path.

In some embodiments, the processor may be further configured to cause a screen to display the navigation path overtop a chart.

In another example embodiment, a method for creating a path for a watercraft is provided. The method includes determining, based on received user input, a set of condition parameters including at least a first condition parameter and a second condition parameter. Each of the condition parameters correspond to desired conditions for a potential navigation path. The method further includes selecting at least one condition parameter of the set of condition parameters and determining a constraint relaxation to apply to the at least one selected condition parameter. The constraint relaxation increases a range of input values of the at least one selected condition parameter that satisfy the corresponding desired conditions for the potential navigation path. The method further includes applying the constraint relaxation to the at least one selected condition parameter to form a constraint relaxed condition parameter for the at least one selected condition parameter and determining a region based on an updated determined set of condition parameters including at least the constraint relaxed condition parameter. Each location within the region satisfies the updated determined set of condition parameters. The method further includes determining a navigation path within the region.

In another example embodiment, a marine electronic device having a processor is provided. The processor is configured to determine, based on received user input, a set of condition parameters including at least a first condition parameter and a second condition parameter. Each of the condition parameters correspond to desired conditions for a potential navigation path. The processor is further configured to select at least one condition parameter of the set of condition parameters and determine a constraint relaxation to apply to the at least one selected condition parameter. The constraint relaxation increases a range of input values of the at least one selected condition parameter that satisfy the corresponding desired conditions for the potential navigation path. The processor is further configured to apply the constraint relaxation to the at least one selected condition parameter to form a constraint relaxed condition parameter for the at least one selected condition parameter and determine a region based on an updated determined set of condition parameters including at least the constraint relaxed condition parameter. Each location within the region satisfies the updated determined set of condition parameters. The processor may be further configured to determine a navigation path within the region.

In another example embodiment, a method of determining a navigation path for a watercraft using an indefinite data set is provided. The method includes determining a region within a body of water, and the determined region includes locations with conditions that satisfy one or more condition parameters corresponding to desired conditions for a potential navigation path. The method further includes bisecting the region based on a shape of the region and based on a determined location of the watercraft, determining a plurality of first potential destinations within the determined region and a plurality of second potential destinations within the determined region based on the bisected region, determining a first potential destination based on the plurality of first potential destinations, and determining a second potential destination based on the plurality of second potential destinations.

In some embodiments, determining the region within the body of water may be based on the indefinite data set by applying a constraint relaxation to one or more groups of data within the indefinite data set until the region is continuous for a predetermined distance.

In some embodiments, determining the navigation path may further include executing a first algorithm using the first potential destination to determine a first potential path where each location along the first potential path is within the determined region, executing a second algorithm using the second potential destination to determine a second potential path where each location along the second potential path is within the determined region, and selecting the navigation path from among the first potential path and the second potential path.

In some embodiments, the first algorithm and the second algorithm may be A*algorithms.

In some embodiments, the first algorithm and the second algorithm may be RRT algorithms.

In some embodiments, the first algorithm and the second algorithm may be D*algorithms.

In some embodiments, selecting the navigation path from among the first potential path and the second potential path may include determining which of the first potential path and the second potential path provides a greatest distance solution corresponding to a location within the region that is furthest from the determined location of the watercraft.

In another example embodiment, a system for determining a navigation path for a watercraft using an indefinite data set is provided. The system includes a processor and a memory including computer executable instructions, and the computer executable instructions are configured to, when executed by the processor, cause the processor to determine a region within a body of water. The determined region includes locations with conditions that satisfy one or more condition parameters corresponding to desired conditions for a potential navigation path. The processor is further configured to bisect the region based on a shape of the region and based on a determined location of the watercraft, determine a plurality of first potential destinations within the determined region and a plurality of second potential destinations within the determined region based on the bisected region, determine a first potential destination based on the plurality of first potential destinations, and determine a second potential destination based on the plurality of second potential destinations.

In some embodiments, the processor may be further configured to execute a first algorithm using the first potential destination to determine a first potential path where each location along the first potential path is within the determined region, execute a second algorithm using the second potential destination to determine a second potential path where each location along the second potential path is within the determined region, and select the navigation path from among the first potential path and the second potential path.

In some embodiments, the first algorithm and the second algorithm may be A*algorithms.

In some embodiments, the first algorithm and the second algorithm may be RRT algorithms.

In some embodiments, the first algorithm and the second algorithm may be D*algorithms.

In some embodiments, selecting the navigation path from among the first potential path and the second potential path may include determining which of the first potential path and the second potential path provides a greatest distance solution corresponding to a location within the region that is furthest from the determined location of the watercraft.

In some embodiments, determining the region within the body of water may be based on the indefinite data set by applying a constraint relaxation to one or more groups of data within the indefinite data set until the region is continuous for a predetermined distance.

In another example embodiment, a marine electronic device having a processor is provided. The processor is configured to determine a region within a body of water, and the determined region includes locations with conditions that satisfy one or more condition parameters corresponding to desired conditions for a potential navigation path. The processor is further configured to bisect the region based on a shape of the region and based on a determined location of the watercraft, determine a plurality of first potential destinations within the determined region and a plurality of second potential destinations within the determined region based on the bisected region, determine a first potential destination based on the plurality of first potential destinations, and determine a second potential destination based on the plurality of second potential destinations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 16:
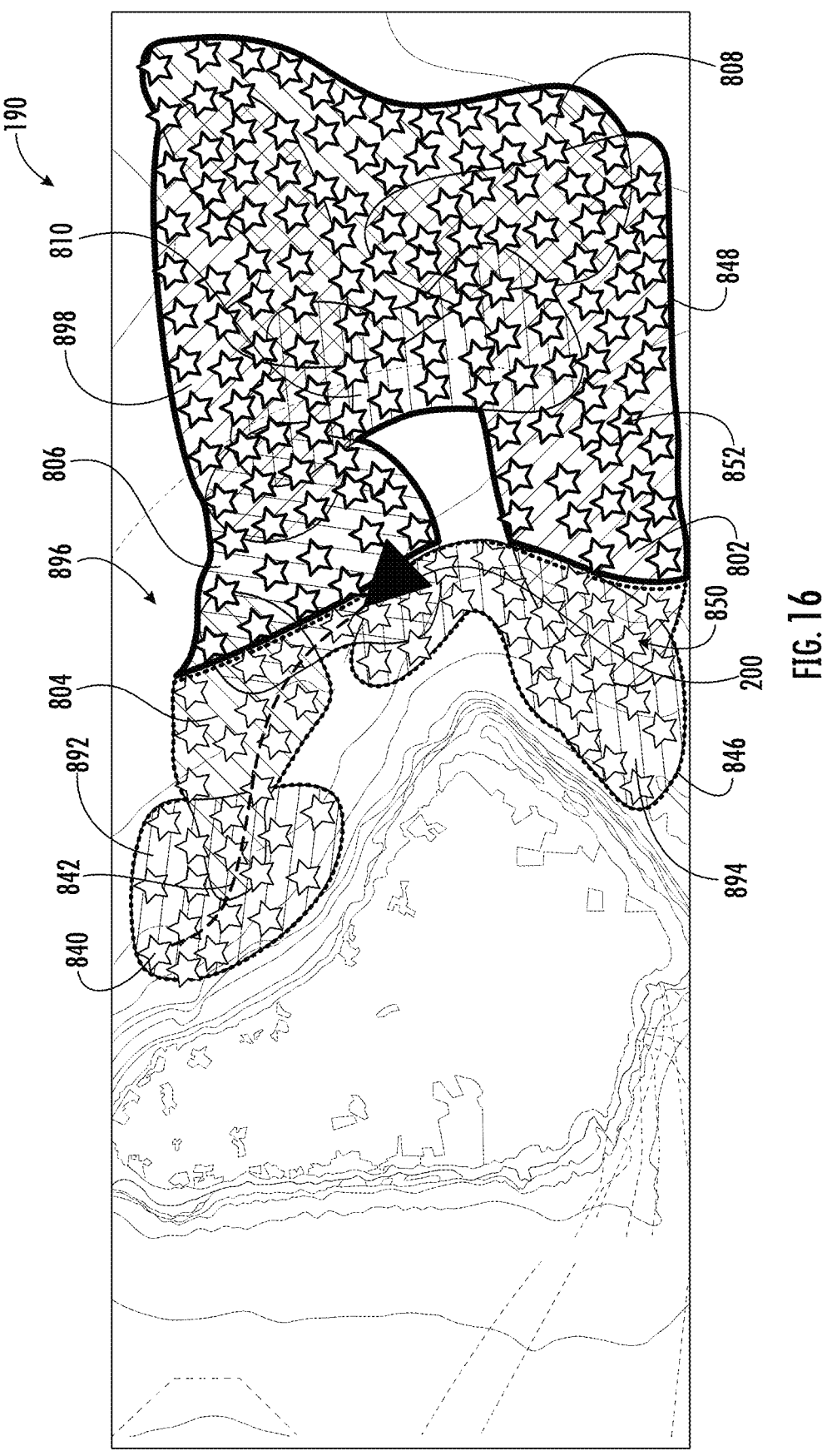
FIG. 16 is the chart of FIGS. 7 and 9-15 with the icon indicating the position of the watercraft having moved along the selected navigation path and with a plurality of third potential destinations demonstrated overtop the third region and a plurality of fourth potential destinations demonstrated overtop the fourth region, in accordance with some embodiments discussed herein.
Figure 17:
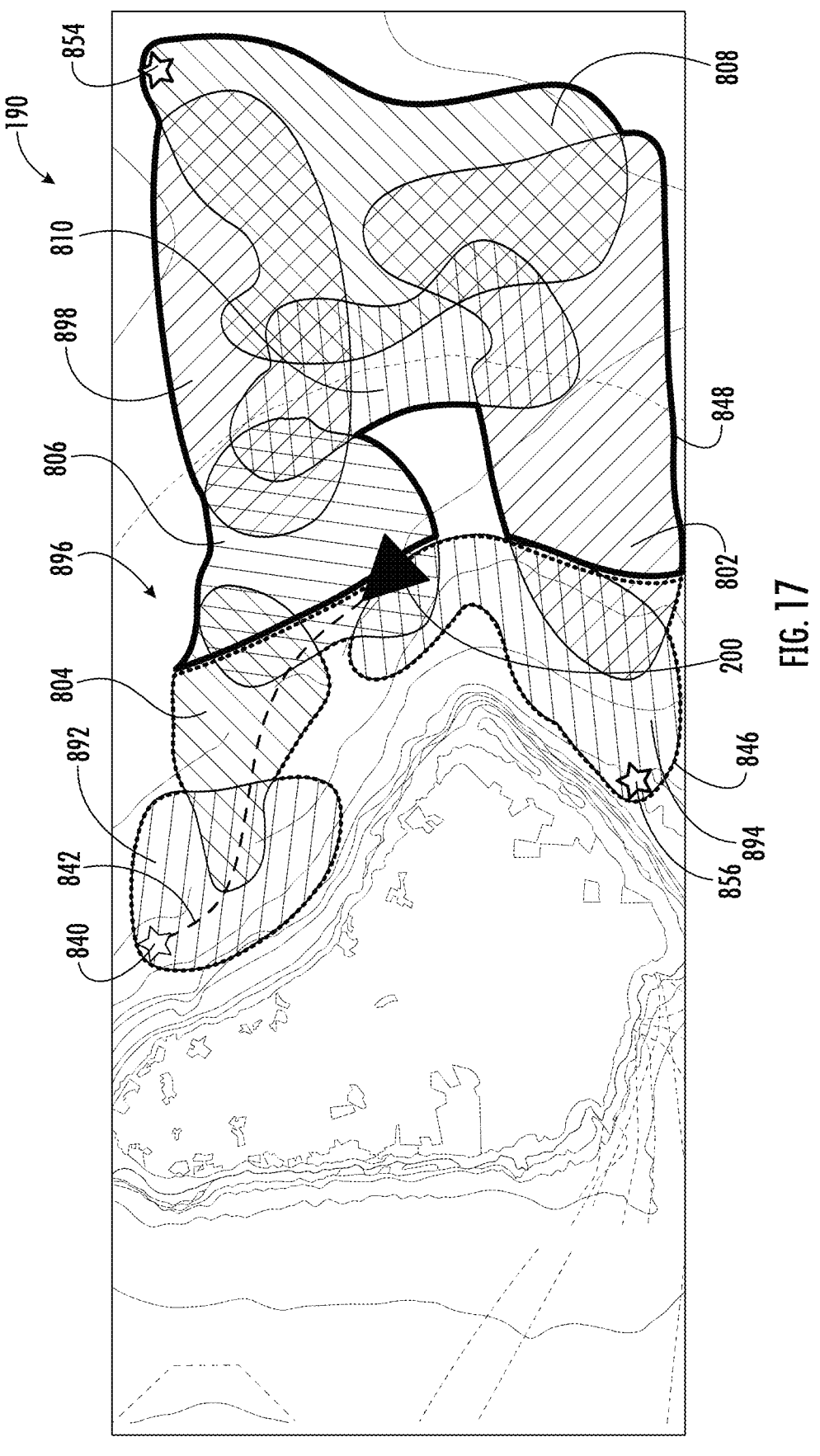
FIG. 17 is the chart of FIGS. 7 and 9-16 with the icon indicating the position of the watercraft having moved along the selected navigation path and with a third potential destination shown as selected within the third region and a fourth potential destination shown as selected within the fourth region, in accordance with some embodiments discussed herein.
Figure 18:
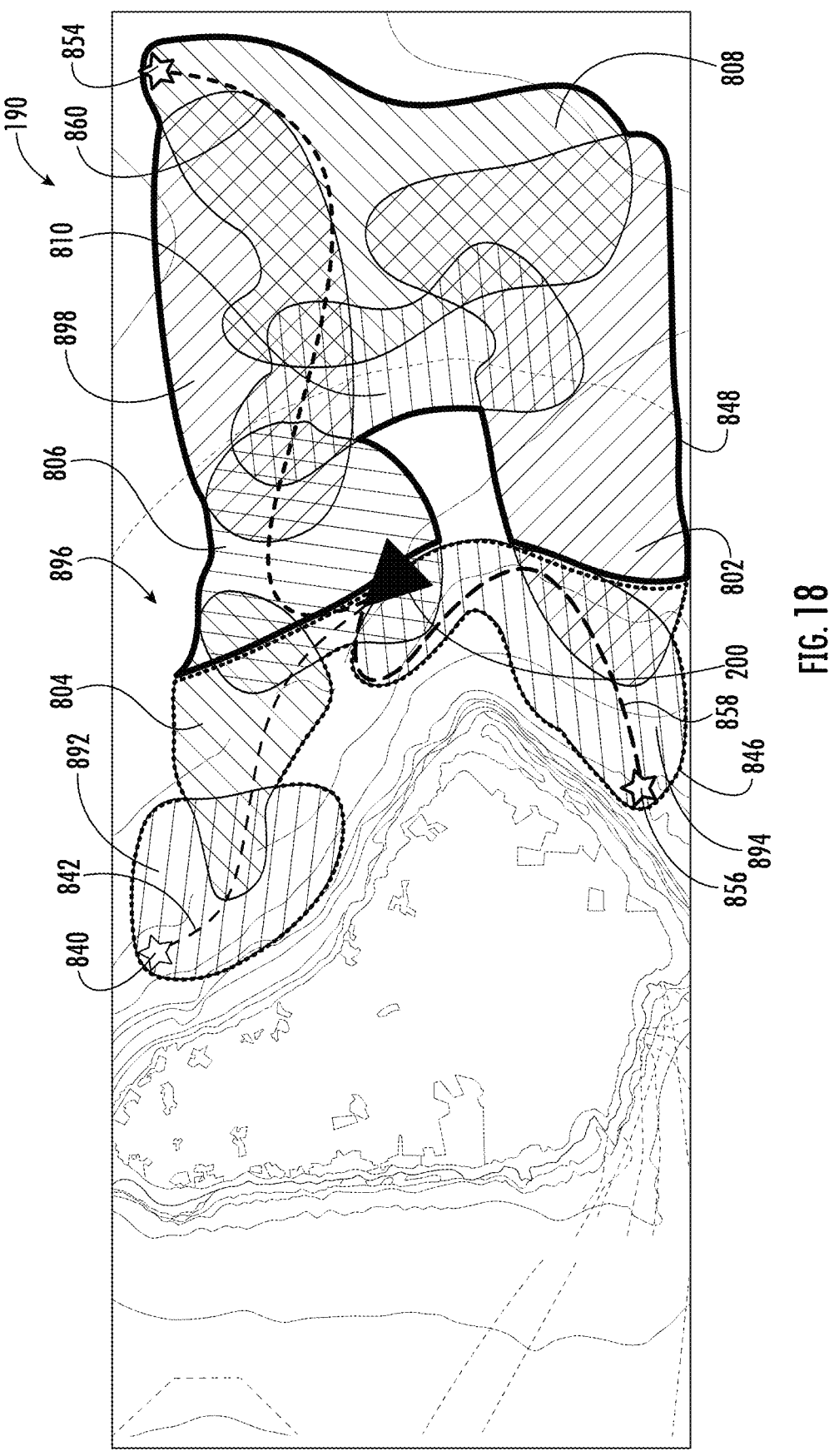
Figure 19:
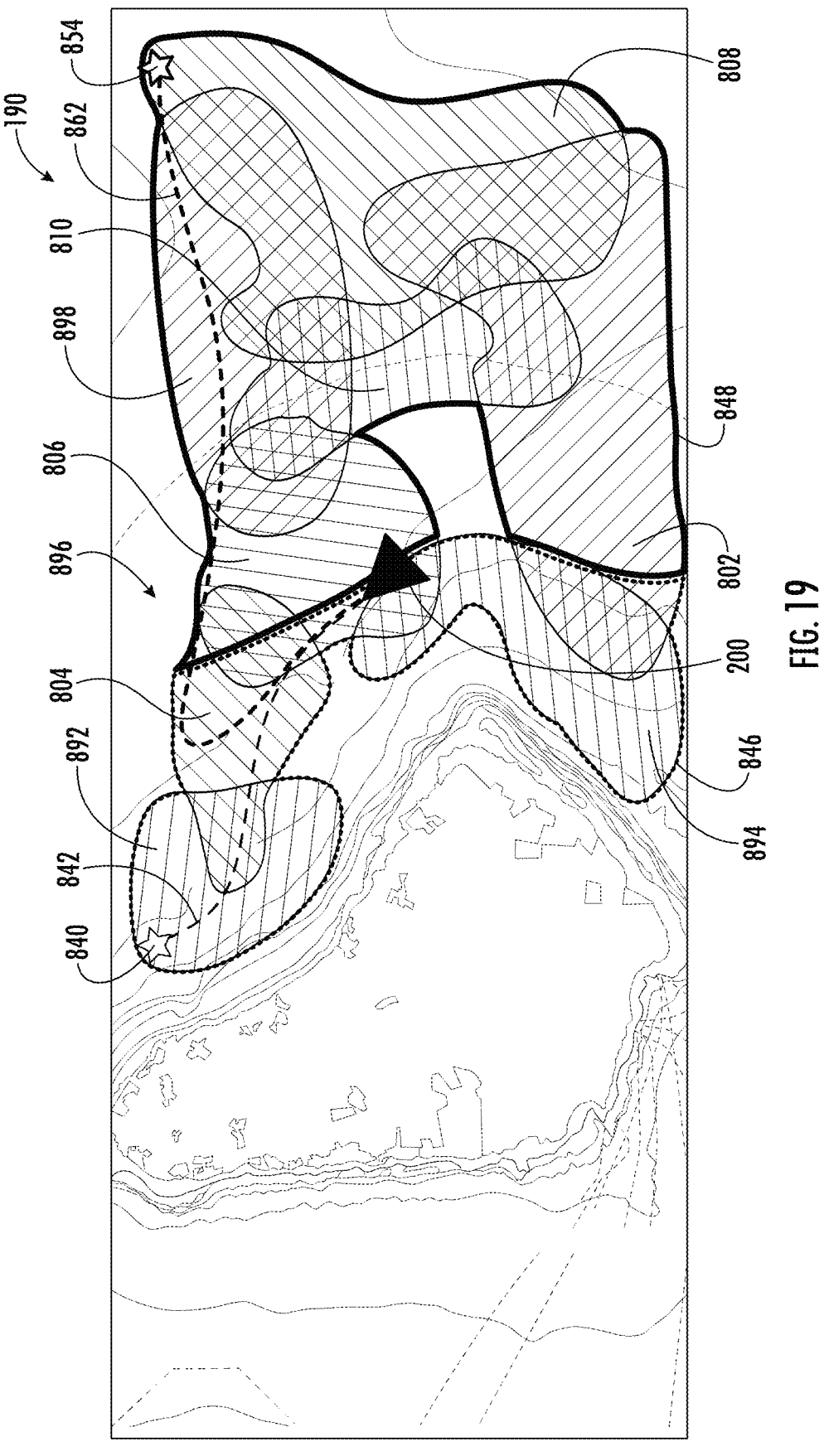
Figure 20:
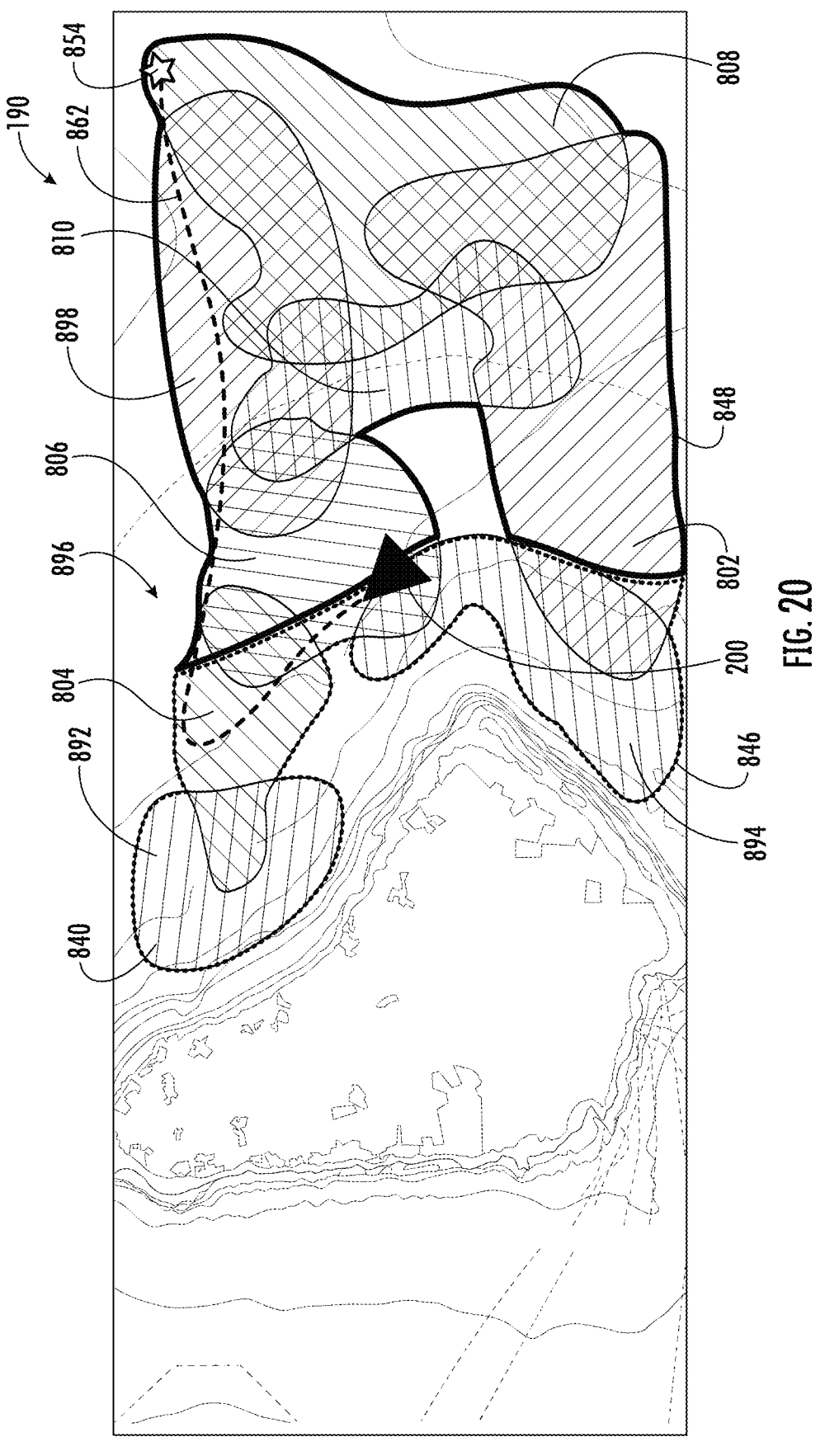
Figure 21:
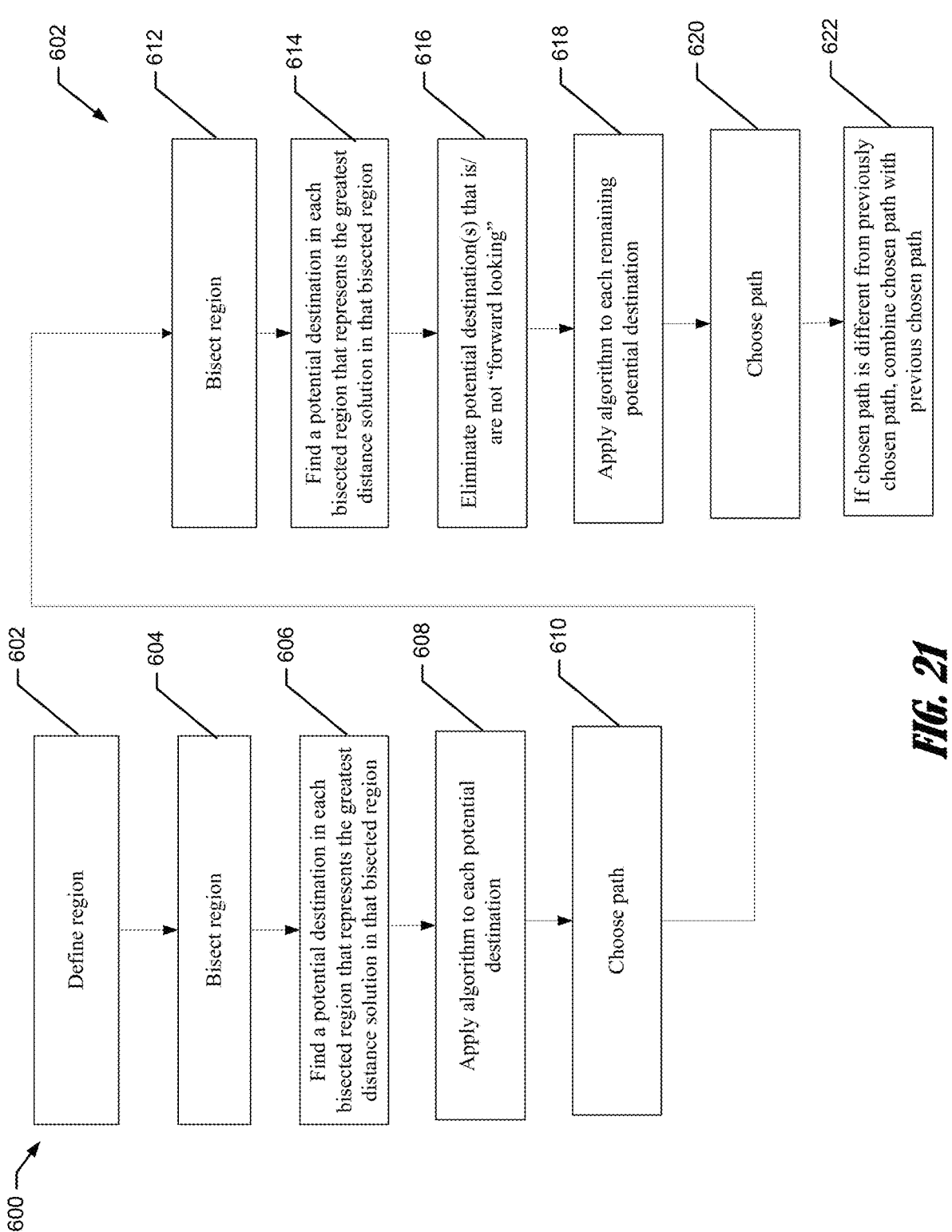
Figure 22:
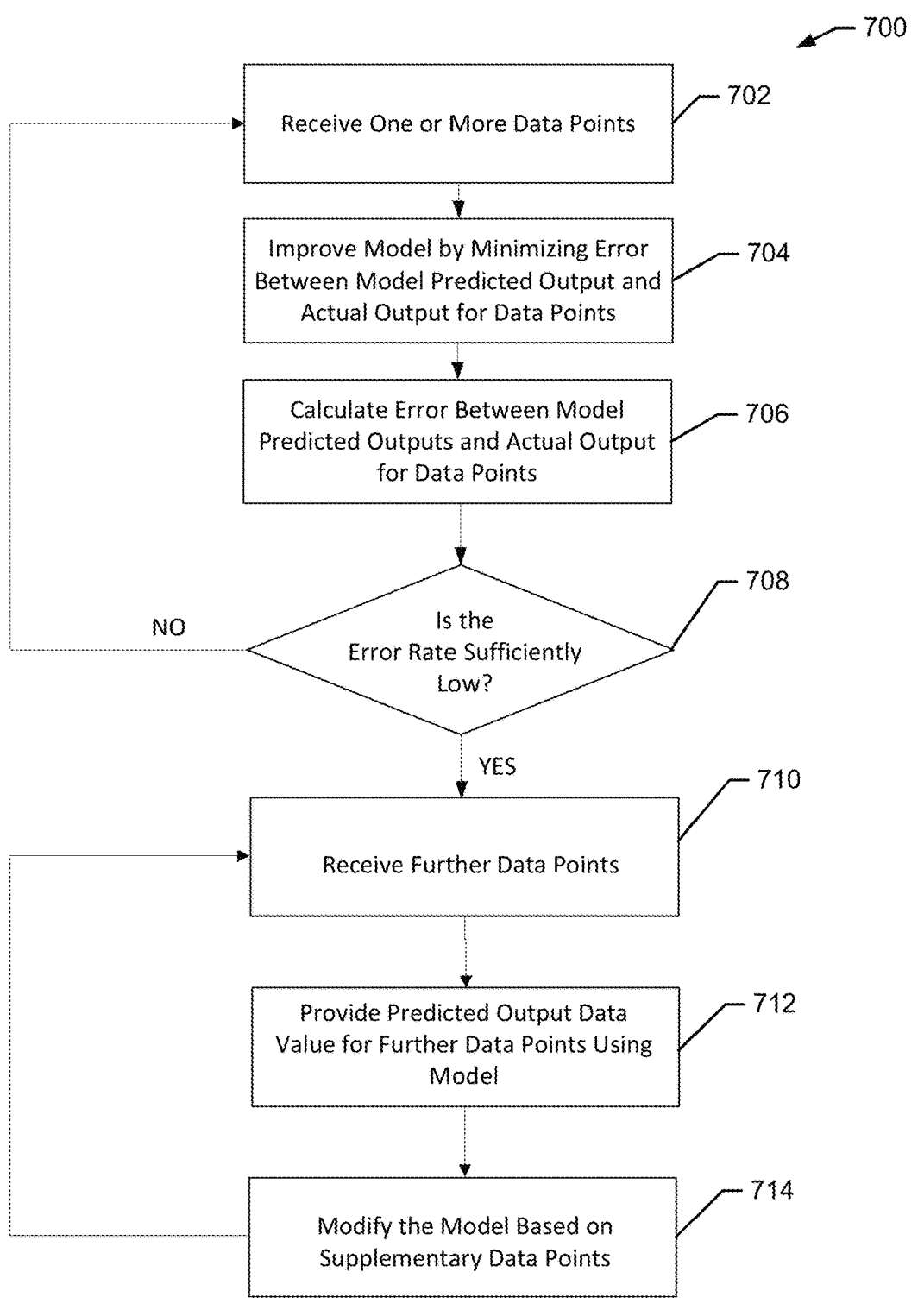
Figure 23:
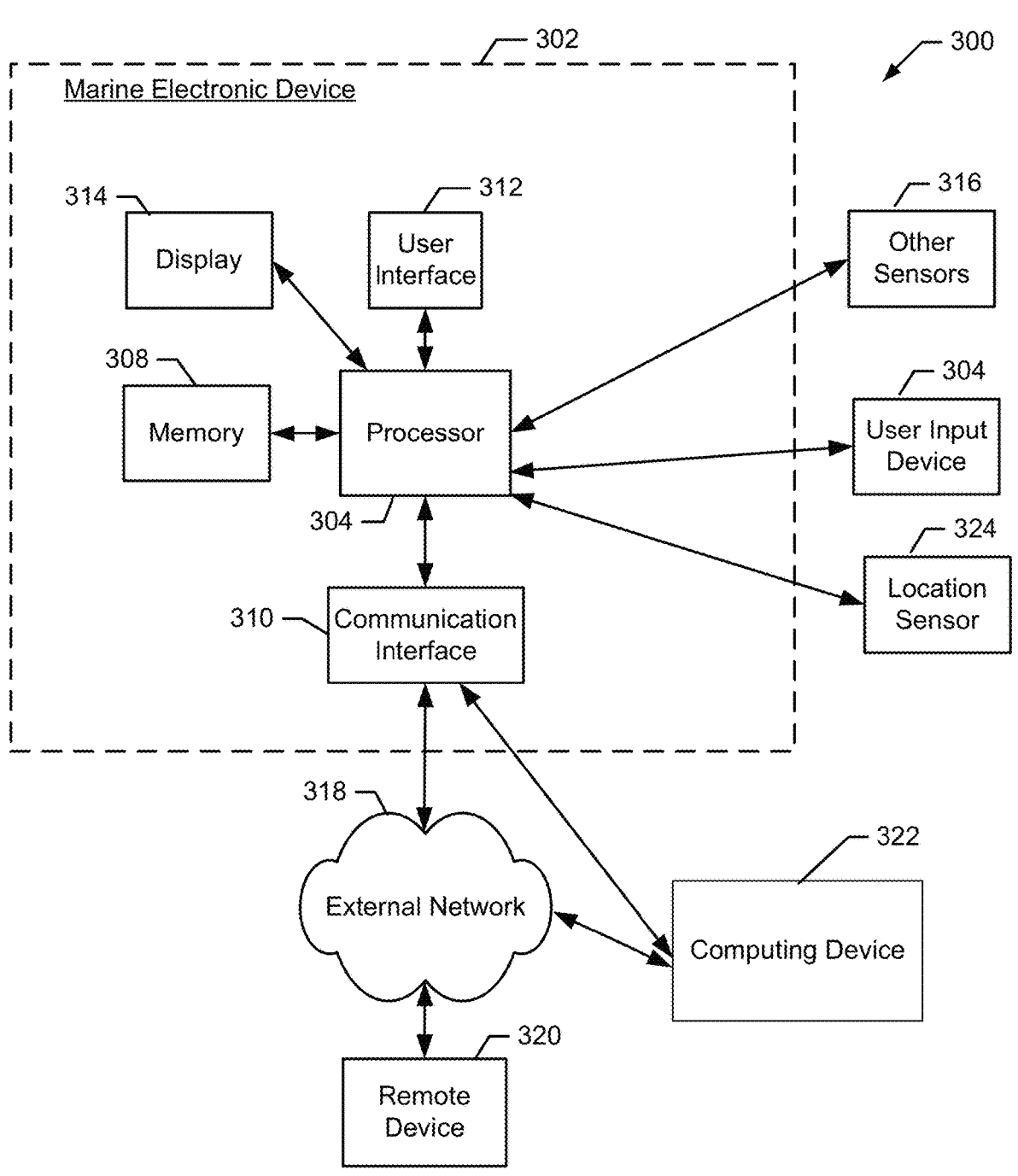

FIG. 18 is the chart of FIGS. 7 and 9-17 with the icon indicating the position of the watercraft having moved along the selected navigation path and with a third potential path illustrated within the third region, which leads to the third potential destination, and a fourth potential path illustrated within the fourth region, which leads to the fourth potential destination, in accordance with some embodiments discussed herein;

FIG. 19 is the chart of FIGS. 7 and 9-18 with the icon indicating the position of the watercraft having moved along the selected navigation path and with the fourth potential path having been adjusted to form a fifth potential path, which is a combination of the fourth potential path and the selected navigation path along with the icon indicating the position of the watercraft has moved, in accordance with some embodiments discussed herein;

FIG. 20 is the chart of FIGS. 7 and 9-19 with the fifth potential path shown as an updated navigation path within the combined region, in accordance with some embodiments discussed herein;

FIG. 21 is a diagram of an example process for generating a path for a watercraft which includes an initial determination and an intermediary determination, in accordance with some embodiments discussed herein;

FIG. 22 illustrates a flowchart of an example method of machine learning, in accordance with some embodiments discussed herein;

FIG. 23 is a block diagram of an example system capable of generating paths for watercrafts, the processor being located remotely, in accordance with some embodiments described herein;

FIG. 24 shows an example method for creating a path for a watercraft, in accordance with some embodiments discussed herein; and FIG. 25 shows an example method for determining a navigation path for a watercraft using an indefinite data set, in accordance with some embodiments discussed herein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Figure 1:
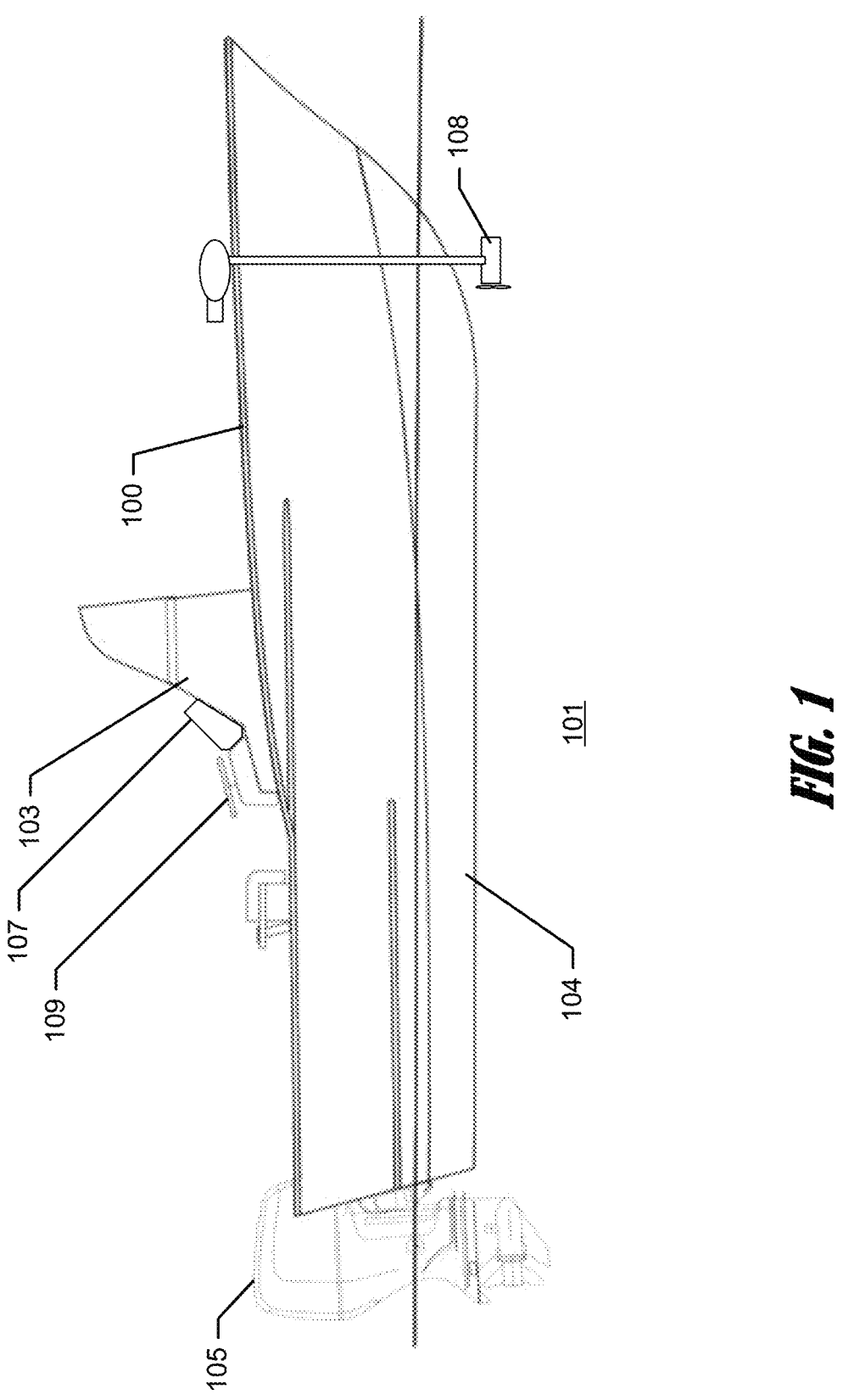
FIG. 1 shows an example watercraft, in accordance with some embodiments described herein.

FIG. 1 shows a watercraft 100 (e.g., a vessel) configured to traverse a marine environment, e.g., body of water 101 (e.g., a portion of a hull 104 of the watercraft 100 is below the surface of the body of water 101). The watercraft 100 may be a surface watercraft, a submersible watercraft, or any other implementation known to those skilled in the art. The watercraft 100 may include one or more marine electronic devices 107, such as may be utilized by a user to interact with, view, or otherwise control various aspects of the watercraft and its various marine systems described herein. In the illustrated embodiment, the marine electronic device 107 is positioned proximate the helm (e.g., steering wheel 109) of the watercraft 100 on a console 103—although other places on the watercraft 100 are contemplated. Likewise, additionally or alternatively, a user's mobile device may include functionality of a marine electronic device.

Depending on the configuration, the watercraft 100 may include a main propulsion motor 105, such as an outboard or inboard motor. Additionally, the watercraft 100 may include a trolling motor 108 configured to propel the watercraft 100 or maintain a position. The motor 105 and/or the trolling motor 108 may be steerable using steering wheel 109, or in some embodiments, the watercraft 100 may have a navigation assembly that is operable to steer the motor 105 and/or the trolling motor 108. The navigation assembly may be connected to a processor and/or be within a marine electronic device 107, or it may be located anywhere else on the watercraft 100. Alternatively, it may be located remotely.

Such as to be described further herein, various systems, methods, and devices described herein enable a processor to generate navigation paths, such as continuous routes, of watercraft based on indefinite data. Such systems generally include a processor and a memory, the memory including instructions configured to, when executed by the processor, cause the processor to execute a number of steps. For example, a processor may be configured to determine, based on received user input, a set of condition parameters including at least a first condition parameter and a second condition parameter. For example, each of the condition parameters may correspond to desired conditions for a potential navigation route. Then, the processor may be configured to select at least one condition parameter of the set of condition parameters. The processor may then be configured to determine a constraint relaxation to apply to the at least one selected condition parameter. The purpose of the constraint relaxation may be to increase a range of input values of the at least one selected condition parameter that satisfy the corresponding desired conditions for the potential navigation route. The processor may also be configured to apply the constraint relaxation to the at least one selected condition parameter to form a constraint relaxed condition parameter for the at least one selected condition parameter and then determine a region based on the determined set of condition parameters including at least the constraint relaxed condition parameter. Each location within the region may satisfy the determined set of condition parameters.

The processor may then determine a navigation path within the region, which, as will be described in more detail herein, may include bisecting the region based on a shape of the region and based on a determined location of the watercraft, determining a plurality of first potential destinations and a plurality of second potential destinations based on the bisected region, determining a first potential destination based on the plurality of first potential destinations, determining a second potential destination based on the plurality of second potential destinations, executing a first algorithm using the first potential destination to determine a first potential path where each part of the first potential path is within the determined region, executing a second algorithm using the second potential destination to determine a second potential path where each part of the second potential path is within the determined region, and then selecting the navigation path from the first potential path and the second potential path. Such steps, when executed by the processor, may generate a continuous path for the watercraft.

It should be appreciated that the use of the term "continuous" herein refers to paths which continue indefinitely, for example, due to iterative generation processes. For example, a "continuous path" may, in some embodiments, be generated by continuously or repeatedly generating pins which make up the "continuous path" such that the "continuous path" has no finite endpoint. Said differently, the "continuous path" may be continuously generated such that it keeps going with no endpoint.

Figure 2:
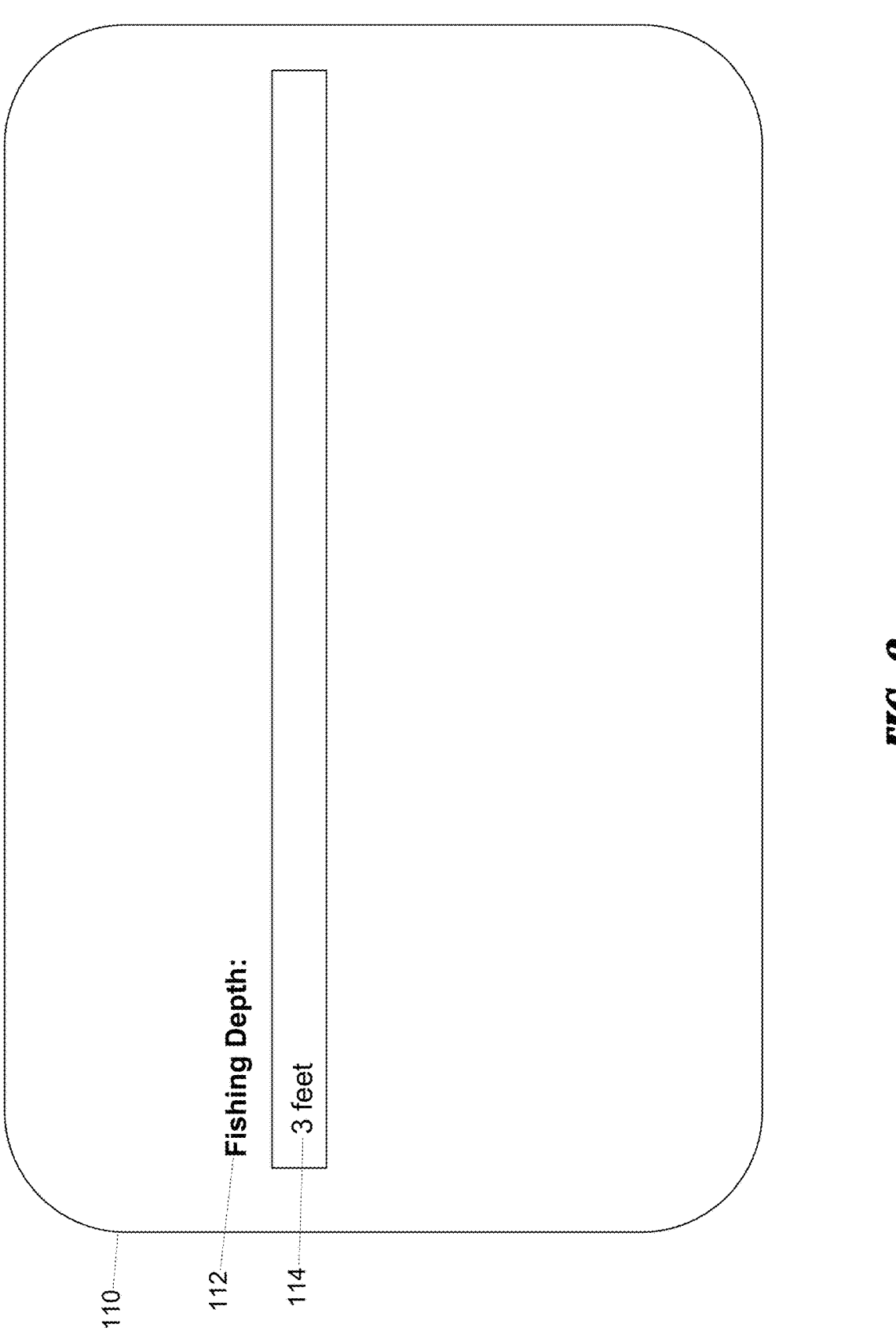
FIG. 2 shows a user interface for a watercraft, the user interface configured to receive a fishing depth, in accordance with some embodiments discussed herein.

FIG. 2 shows an example user interface 110 that prompts a user for a preferred fishing depth at 112 and accepts the preferred fishing depth, which is 3 feet, at 114. The preferred fishing depth 114, which is a single value, may be used to determine the set of condition parameters. For example, a processor may use the preferred fishing depth as a first condition parameter and then determine other condition parameters automatically, such as a minimum turn radius of the watercraft, a minimum depth in which the watercraft can safely travel, and/or optimal areas based on a tide condition. Then, as will be described in more detail herein, a constraint relaxation may be applied to any of the condition parameters. If the constraint relaxation is applied to the preferred fishing depth, for example, the processor may determine an appropriate deviation such that instances where the fishing depth varies from exactly 3 feet are incorporated into a continuous navigation path.

Figure 3:
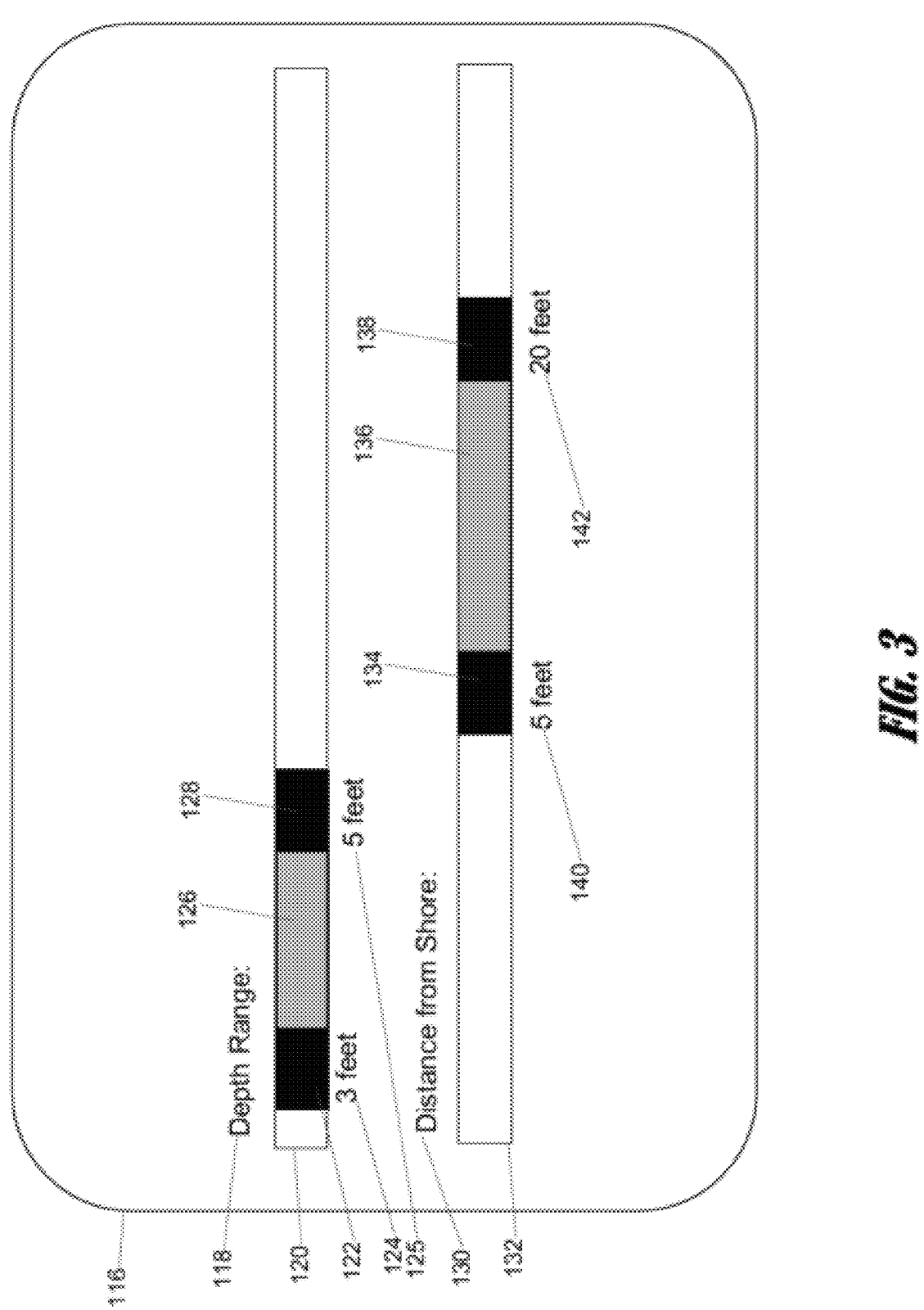
FIG. 3 shows another user interface for a watercraft, the user interface having two sliding bars for a user to input a depth range and a range of distances from shore, in accordance with some embodiments discussed herein.

FIG. 3 shows another example user interface 116 that prompts a user to indicate a preferred depth range at 118 and then accepts the preferred depth range through the sliding bar interface 120. In the example shown, a first bar 122 indicating a lower preferred limit indicates a lower limit of 3 feet at 124, and a second bar 128 indicating a higher preferred limit indicates a higher limit of 5 feet at 125. The shaded region 126 between the first bar 122 and the second bar 128 indicates that all the values between the selected limits of 3 feet and 5 feet will be included in the preferred depth range. The user interface 116 also prompts the user to indicate a preferred distance from shore at 130 and then accepts the preferred range of distances from shore through the sliding bar interface 132. In the example shown, a third bar 134 indicating a lower preferred limit indicates a lower limit of 5 feet at 140, and a fourth bar 138 indicating a higher preferred limit indicates a higher limit of 20 feet at 142. The shaded region 136 between the third bar 134 and the fourth bar 138 indicates that all the values between the selected limits of 5 feet and 20 feet will be included in the preferred range of distances from shore. The preferred depth range and the preferred range of distances from shore, which are ranges of values, may be used to determine the set of condition parameters.

For example, a processor may use the preferred fishing depth range as a first condition parameter and the preferred range of distances from shore as a second condition parameter. The processor may then determine other condition parameters automatically, such as a minimum turn radius of the watercraft, a minimum depth in which the watercraft can safely travel, and/or optimal areas based on a tide condition. Then, as will be described in more detail herein, a constraint relaxation may be applied to any of the condition parameters. If the constraint relaxation is applied to the optimal areas based on the tide condition, for example, the processor may determine an appropriate deviation such that instances where less-than optimal areas based on the tide condition are incorporated into a continuous navigation path. Further, the processor might alternatively or additionally apply a constraint relaxation to the preferred range of distances from shore such that the continuous navigation path can incorporate instances in which, e.g., a distance from shore of 20.8 feet can be included.

Although FIGS. 2-3 illustrate embodiments in which user input may directly correspond to one or more condition parameters, in other embodiments, the user may indicate a desired mode, and the processor may be configured to determine at least one condition parameter based on the desired mode. For example, in some embodiments, such as will be described with respect to FIGS. 4-5, the desired mode may correspond to at least one of a desired fish type or a desired fishing style. Other desired modes are also contemplated, such as those related to activities other than fishing.

Figure 4:
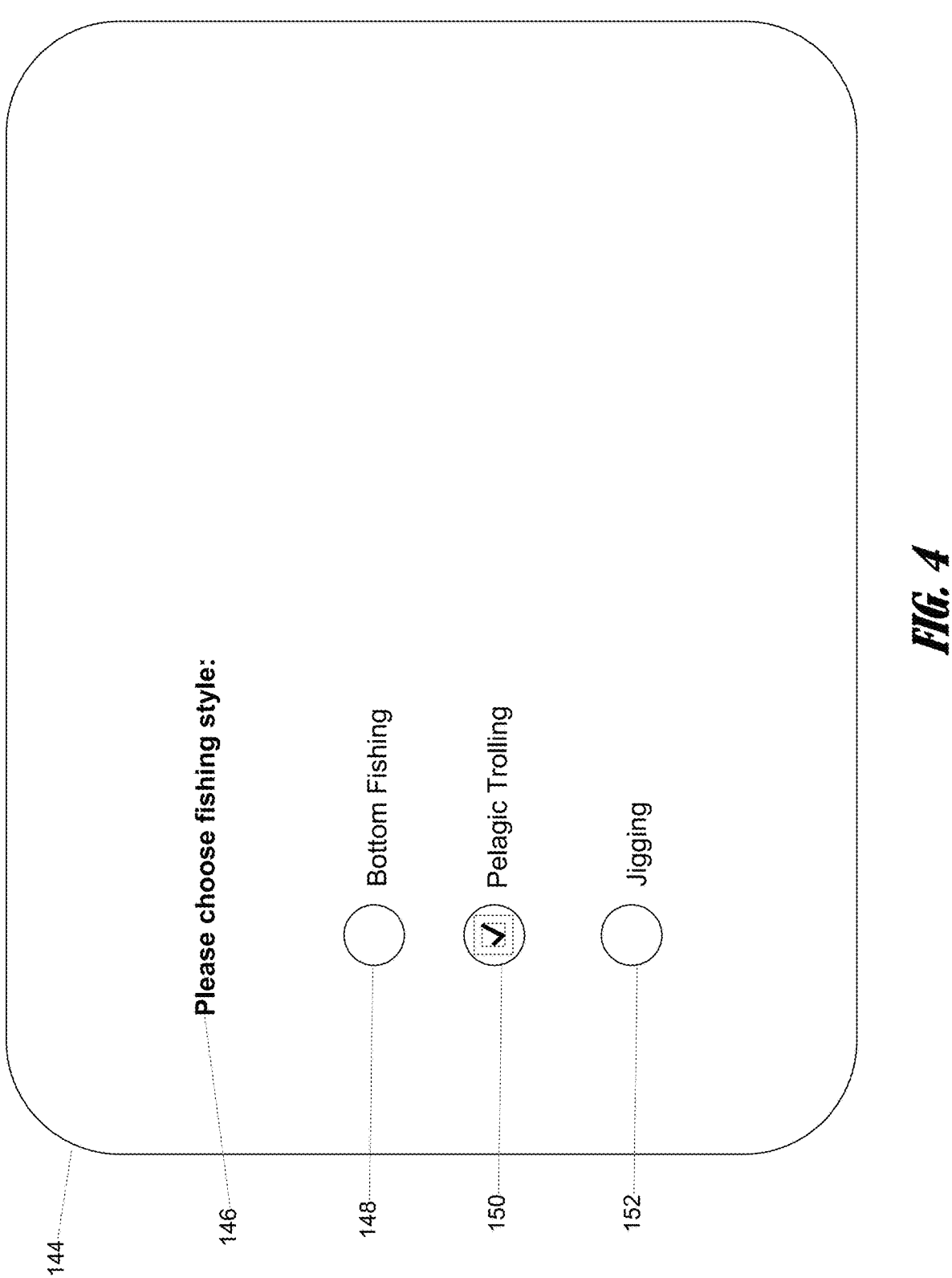
FIG. 4 shows another user interface for a watercraft, the user interface having three options for selection of a fishing style, in accordance with some embodiments discussed herein.

FIG. 4 shows an example user interface 144 that prompts a user to indicate a preferred fishing style at 146 and then gives the user a first option 148 for bottom fishing, a second option 150 for pelagic trolling, and a third option 152 for jigging. In the example shown, the second option 150 for pelagic trolling is selected. The preferred fishing style, which does not indicate a value of a parameter at all, may be used to determine the set of condition parameters. For example, a processor may use the preferred fishing style to automatically determine a depth minimum associated with the desired fishing style as being a first condition parameter and then determine a preferred weather condition associated with the desired fishing style as a second condition parameter. The processor may then determine other condition parameters automatically, such as a minimum turn radius of the watercraft, a minimum depth in which the watercraft can safely travel, and/or optimal areas based on a tide condition. Then, as will be described in more detail herein, a constraint relaxation may be applied to any of the condition parameters. If the constraint relaxation is applied to the optimal areas based on the tide condition, for example, the processor may determine an appropriate deviation such that instances where less-than optimal areas based on the tide condition are incorporated into a continuous navigation path. Further, the processor might alternatively or additionally apply a constraint relaxation to the preferred weather condition such that the continuous navigation path can incorporate instances in which, e.g., an area with slightly higher-than-preferred winds can be included.

Figure 5:
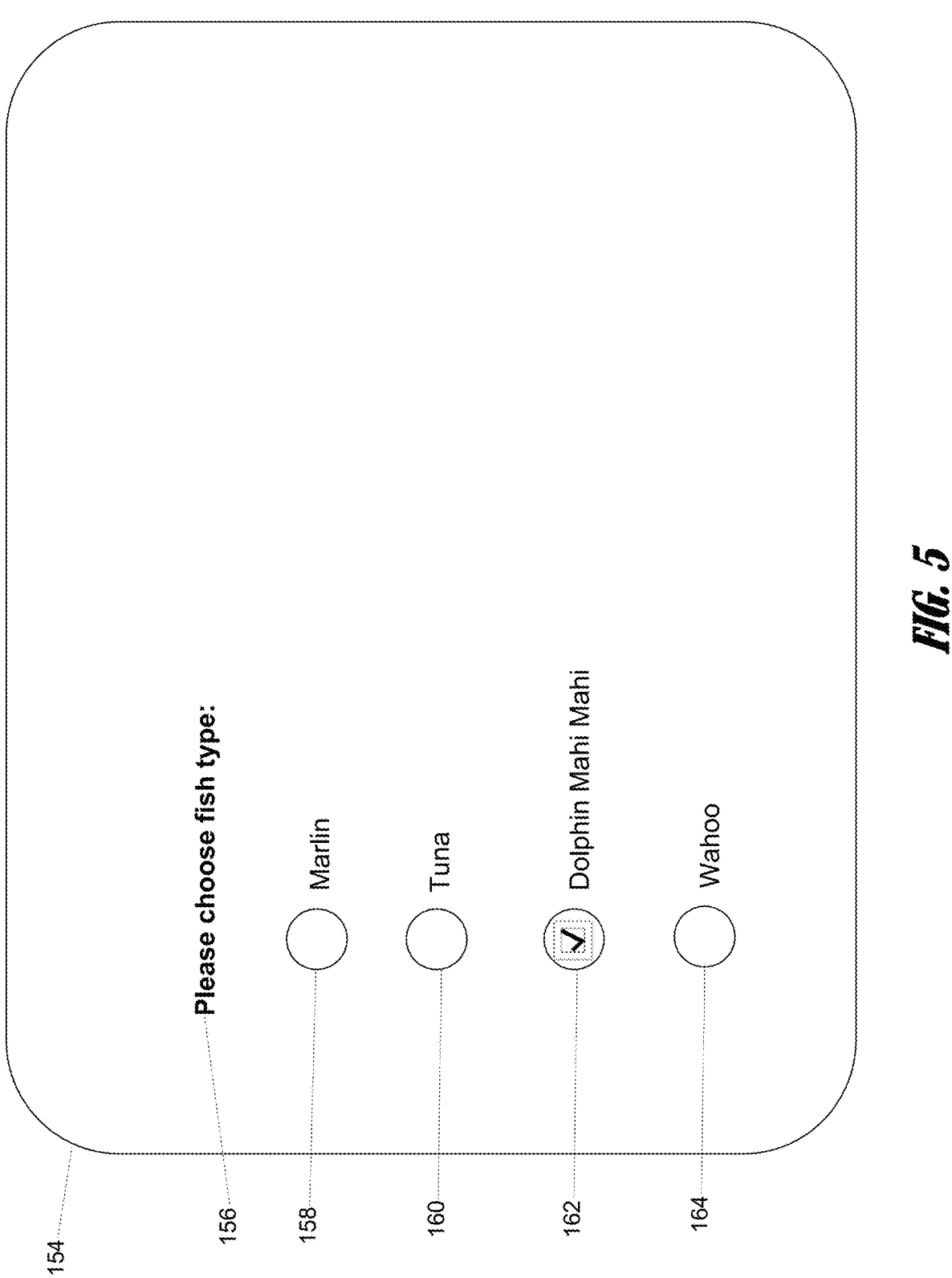
FIG. 5 shows another user interface for a watercraft, the user interface having four options for selection of a fish type, in accordance with some embodiments discussed herein.

FIG. 5 shows another example user interface 154 that prompts a user to indicate a preferred fish type at 156 and then gives the user a first option 158 for marlin, a second option 160 for tuna, a third option 162 for dolphin mahi mahi, and a fourth option 164 for wahoo. In the example shown, the third option 162 for dolphin mahi mahi is selected. The preferred fish type, which does not indicate a value of a parameter at all, may be used to determine the set of condition parameters. For example, a processor may use the preferred fish type to automatically determine a depth range associated with the desired fish type as being a first condition parameter and then determine a preferred tide condition associated with the desired fish type as a second condition parameter. The processor may then determine other condition parameters automatically, such as a minimum turn radius of the watercraft, a minimum depth in which the watercraft can safely travel, and/or optimal areas based on a weather condition. Then, as will be described in more detail herein, a constraint relaxation may be applied to any of the condition parameters. If the constraint relaxation is applied to the depth range, for example, the processor may determine an appropriate deviation such that instances of slightly shallower depth are incorporated into a continuous navigation path. Further, the processor might alternatively or additionally apply a constraint relaxation to the preferred weather condition such that the continuous navigation path can incorporate instances in which, e.g., an area with slightly higher-than-preferred winds can be included.

While the set of condition parameters may be based fully or in part on user input, as described herein with respect to FIGS. 2-5, a processor may determine a set of condition parameters based on one or more other factors such as environmental data, activity data, or vessel data, among other sources of data. Further, as will be described in more detail herein, the set of condition parameters may be determined using an artificial intelligence model that has access to a variety of internal and/or external data.

Figure 6:
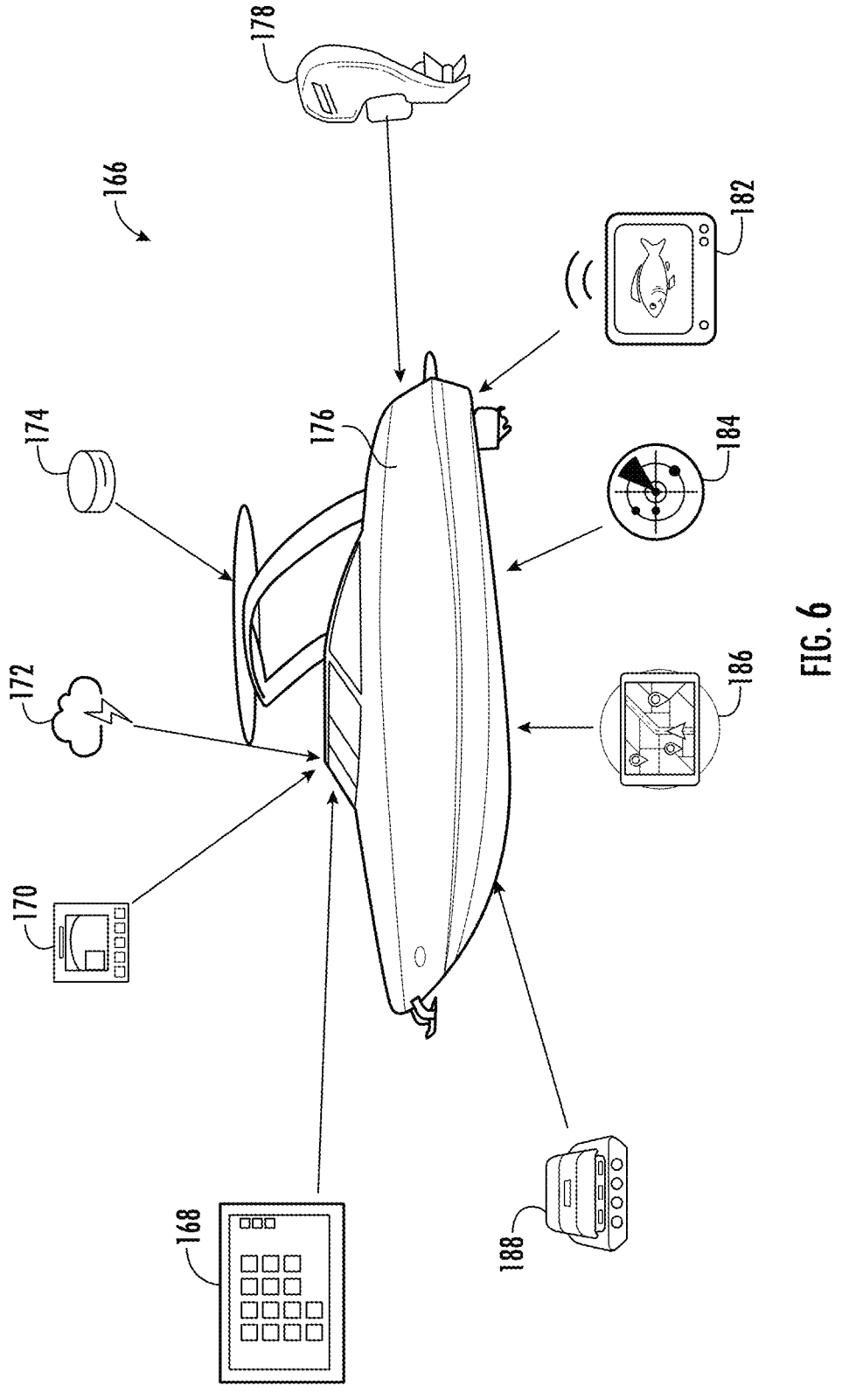
FIG. 6 is a diagram showing various systems on an example watercraft, in accordance with some embodiments discussed herein.

FIG. 6 is a diagram 166 that shows a watercraft 176 with callouts showing various elements that may help determine the set of condition parameters for the watercraft 176 in different ways. The marine electronic device 168 may be connected to one or all of the elements shown in FIG. 6, or the elements may be connected in another way. The autopilot controller 170 may be usable to control elements such as the navigation assembly 188 and/or the motor 178. Further, the autopilot controller 170 may be in communication with other elements such as weather data 172 (which may be obtained from an external network), sonar system 182, radar 184, and/or GPS system 186 in order to make determinations such as will be described in more detail herein. In some embodiments, the watercraft 176 may have a compass 174 that is connected to the navigation assembly 188. Although the autopilot controller 170 and the navigation assembly 188 are separate in the embodiment shown, the autopilot controller 170 and the navigation assembly 188 may be integrated in one element, in other embodiments. Further, in some other embodiments, the watercraft 176 may not even have one or both of the autopilot controller 170 and the navigation assembly 188.

The resulting set of condition parameters that are generated by the processor may include a variety of different types of parameters. For example, the set of condition parameters may include data received from a network, at least one of a depth minimum of a watercraft, a minimum turn radius of the watercraft, a weather condition, a tide condition, sensor data, GPS data, sonar data, radar data, marine data (such as subscription-based marine data, among other types), and/or a territorial condition received from AIS, among other parameters.

FIGS. 7-20 illustrates an example scenario in which a processor determines, based on received user input, a set of five condition parameters, and then uses the five condition parameters to determine and apply one or more constraint relaxation(s) such that a continuous path for a watercraft can be generated based on a determined region. Each of the five condition parameters correspond to different desired conditions for a potential navigation route. As described above with respect to FIGS. 2-5, the user input may or may not directly define certain ones of the condition parameters.

Figure 8:
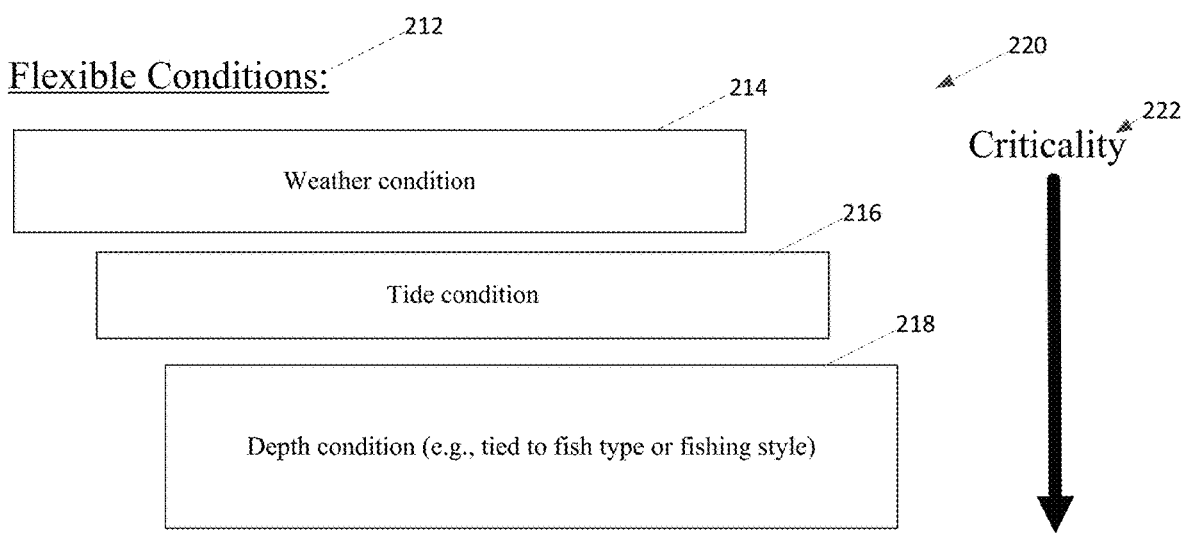
FIG. 8 is a diagram showing an example determination process for selecting one or more condition parameters for constraint relaxation, in accordance with some embodiments discussed herein.
Figure 8:
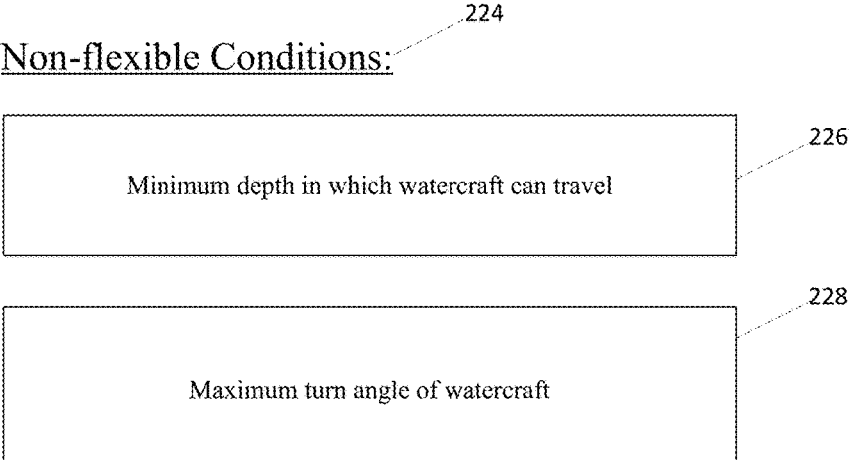

With reference to FIG. 8, in the foregoing example, a first condition parameter will be a weather condition 214, which, in the example, will be areas in which wind conditions are between 10 and 15 knots. A second condition parameter will be a tide condition 216, which, in the example, will be areas in which the processor deems to be favorable based on the currently detected tide. A third condition parameter will be a depth condition 218, which, in the example, will be between 3 and 5 feet. A fourth condition parameter will be a minimum depth in which the watercraft can travel, which, in the example, will be 2 feet. Finally, a fifth condition parameter will be a minimum turn radius of the watercraft 228, which, in the example will be 35 degrees. It should be appreciated that the condition parameters may be any other conditions related to a watercraft, other than those exemplified herein.

Figure 7:
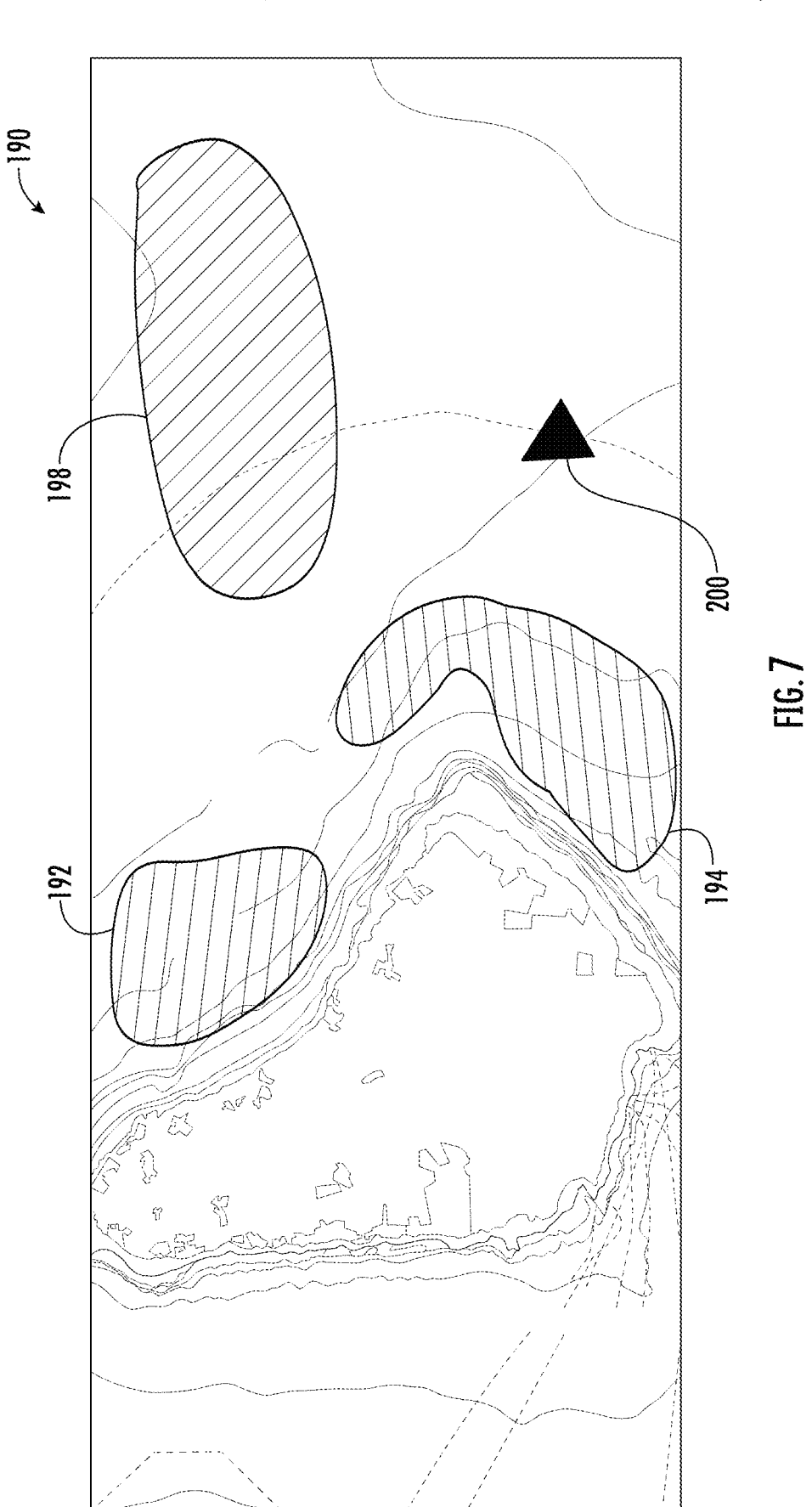
FIG. 7 is a chart showing an icon indicating a position of a watercraft and three highlighted regions that do not overlap, in accordance with some embodiments discussed herein.

FIG. 7 shows an icon 200 representing a watercraft on a chart 190. The chart 190 includes a first highlighted region 192, a second highlighted region 194, and a third highlighted region 198. The first, second, and third highlighted regions 192, 194, and 198 represent areas in which all of the condition parameters are met. For example, the first, second, and third highlighted regions 192, 194, and 198 may represent areas on the chart 190 in which the wind conditions are between 10 and 15 knots, the tide conditions are favorable, and the depth is between 3 and 5 feet. Notably, the first, second, and third highlighted regions 192, 194, and 198 are not connected and do not provide any opportunity for a path to be created that crosses through all of the regions. Thus, the processor may determine that at least one constraint relaxation needs to be determined and applied. In some embodiments, the processor may make such a determination based on the highlighted regions failing to be continuous for a predetermined distance from the watercraft. In other embodiments, the determination as to whether a constraint relaxation needs to be made may be made in different ways.

FIG. 8 is a diagram showing how condition parameters might be evaluated in a determination of how a constraint relaxation should be applied. First, in order to select one or more condition parameters from a set of condition parameters that will be subject to a constraint relaxation, a processor may categorize the condition parameters based on flexibility. For example, in the ongoing example, the weather condition 214, the tide condition 216, and the depth condition 218 may be flexible condition parameters, whereas the minimum depth in which the watercraft can travel 226 and the minimum turn radius of the watercraft 228 may be non-flexible conditions. Flexibility may be determined based on an expected consequence of allowing the watercraft to operate outside of the condition parameter. For example, if the watercraft is allowed to operate beyond the minimum depth in which the watercraft can travel 226, the watercraft is very likely to become stuck (or worse). Thus, because the consequence is so great, the processor may deem the condition parameter to be a non-flexible condition. However, if the watercraft is allowed to operate outside of the weather condition 214, at least slightly, the expected consequence may be only that conditions will become less optimal for, e.g., catching a fish. Thus, because the consequence is so minimal, the processor may deem the condition parameter to be a flexible condition. Although the condition parameters are grouped into flexible conditions 212 and non-flexible conditions 224 in FIG. 8, in some other embodiments, the condition parameters may be ranked (rather than categorized) based on flexibility (and/or criticality, as will be described herein).

The processor may then rank the set of condition parameters based on criticality 222. In some embodiments, the processor may only rank the flexible conditions 212 based on criticality 222, as in FIG. 8, but in other embodiments, the processor may rank all of the conditions based on criticality (and/or flexibility, as described herein). For example, as shown in FIG. 8, the flexible conditions 212 are ranked based on criticality 222 such that the depth condition 218 is the most critical flexible condition parameter, the tide condition 216 is the next-most critical flexible condition parameter, and the weather condition 214 is the least critical flexible condition parameter.

Next, the processor may determine and apply a constraint relaxation to the least critical condition parameter that is flexible, which, in the ongoing example, is the weather condition 214. The constraint relaxation may increase a range of input values of the selected condition parameter that satisfy the corresponding desired conditions for the potential navigation route. In the ongoing example, when a constraint relaxation is determined and applied to the weather condition 214, the processor may determine a larger range of input values of the weather condition 214. For example, the original range of values for the weather condition 214 may have been between 10 and 15 knots, but the processor may determine that constraint relaxed weather condition as being less than 16 knots. The result may be a constraint relaxed condition parameter that can be incorporated within the set of condition parameters. This may maintain the overall integrity of the goal, which may, e.g., be a fishing style, while increasing the coverage of highlighted regions on the chart such that the highlighted regions are continuous for a longer distance from the watercraft.

The processor may then determine whether the resulting regions, which incorporate the constraint relaxed condition parameter (e.g., the constraint relaxed weather condition parameter), are continuous for a predetermined distance from the watercraft. The resulting regions may make up an updated region that is based on the determined set of condition parameters, including the constraint relaxed condition parameter. In other words, each location within the updated region may satisfy the determined set of condition parameters, which include the constraint relaxed condition parameter. If the first constraint relaxed condition parameter, such as the constraint relaxed weather condition parameter, is not enough to cause the region to be continuous for a predetermined distance, the processor may determine and apply another constraint relaxation. In the ongoing example, the processor may determine that none of the nearby regions have differing tide conditions, and thus that determining and applying a constraint relaxation to the tide condition 216 would not help. The processor may then turn to determining and applying a constraint relaxation to the depth condition 218. In doing so, the processor may acknowledge the minimum depth in with the watercraft can travel 226, which is a non-flexible condition. In other words, the processor may determine a larger range of input values of the depth condition 218 but may keep in mind that the minimum depth in which the watercraft can travel 226 is an absolute minimum. For example, the original range of values for the depth condition 216 may have been between 3 and 5 feet, but the processor may determine that constraint relaxed depth condition as being between 2.2 and 5.8 feet. The result may be another constraint relaxed condition parameter that can be incorporated within the set of condition parameters. Again, this may maintain the overall integrity of the goal, which may, e.g., be a fishing style, while increasing the coverage of highlighted regions on the chart such that the highlighted regions are continuous for a longer distance from the watercraft As will be described herein, the determination of the constraint relaxation(s) may utilize an artificial intelligence model to optimize the constraint relaxation process. That is, a machine learning model may be able to increase the weather condition 214 and the depth condition 218 by optimal amounts rather than by "maxing out" the range of values for the constraint relaxed weather condition parameter before determining and applying a constraint relaxation to the depth condition 218 at all. For example, rather than increasing the weather range from 10 to 15 knots to 0 to 20 knots of wind and then increasing the depth range from 3 to 5 feet to 2.2 feet to 5 feet, an artificial intelligence model may be able to make more intuitive considerations that lead to a more optimal outcome that includes a weather range of 0 to 18 knots and a depth range of 2.2 feet to 5.8 feet.

The processor may then again determine whether the resulting regions, which incorporate all of the constraint relaxed condition parameters (e.g., the constraint relaxed weather condition parameter and the constraint relaxed depth condition parameter), are continuous for a predetermined distance from the watercraft. The resulting regions may make up another updated region that is based on the determined set of condition parameters, including the constraint relaxed condition parameters. In other words, each location within the updated region may satisfy the determined set of condition parameters, which include the constraint relaxed condition parameters. If the first and second constraint relaxed condition parameters, such as the constraint relaxed weather condition parameter and the constraint relaxed depth condition parameter, are not enough to cause the region to be continuous for a predetermined distance, the processor may determine and apply another constraint relaxation. However, if the first and second constraint relaxed condition parameters are enough to cause the region to be continuous for a predetermined distance, which is the case in the ongoing example, the processor may continue its process of creating the navigation path for the watercraft, as will be described herein.

Figure 9:
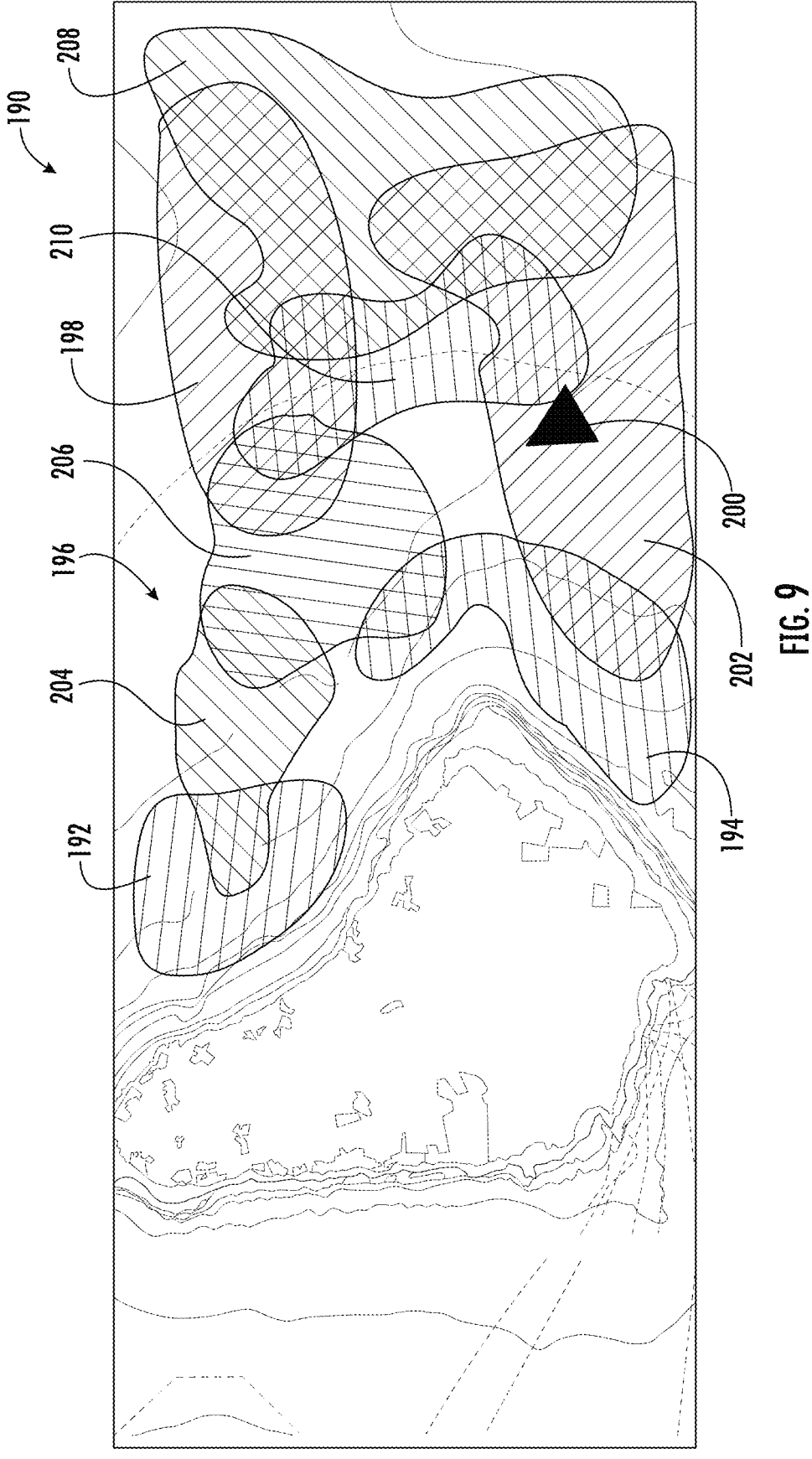
FIG. 9 is the chart of FIG. 7 with the three highlighted regions, as well as five additional highlighted regions obtained through application of one or more constraint relaxation(s), which form a combined region, in accordance with some embodiments discussed herein.

FIG. 9 shows the icon 200 representing the watercraft on the chart 190. The chart 190 includes the first highlighted region 192, the second highlighted region 194, and the third highlighted region 198, as well as a fourth highlighted region 204, a fifth highlighted region 206, a sixth highlighted region 210, a seventh highlighted region 208, and an eighth highlighted region 202, all of which make up a region 196. The first, second, third, fourth, fifth, sixth, seventh, and eighth highlighted regions 192, 194, 198, 204, 206, 210, 208, and 202 represent additional areas in which all of the condition parameters, plus the relaxed constraint condition parameter(s) are met. For example, the first, second, third, fourth, fifth, sixth, seventh, and eighth highlighted regions 192, 194, 198, 204, 206, 210, 208, and 202 represent areas on the chart 190 in which the wind conditions are between 0 and 18 knots, the tide conditions are favorable, and the depth is between 2.2 and 5.8 feet. Notably, the first, second, third, fourth, fifth, sixth, seventh, and eighth highlighted regions 192, 194, 198, 204, 206, 210, 208, and 202 provide various opportunities for paths to be created that extend a predetermined distance from the watercraft (which is represented by icon 200). Thus, the processor may determine that no more constraint relaxations need to be determined and applied. In some embodiments, the processor may make such a determination based on the highlighted regions being continuous for a predetermined distance from the watercraft.

In other embodiments, however, the determination as to whether a constraint relaxation needs to be made may be made in different ways.

Figure 10:
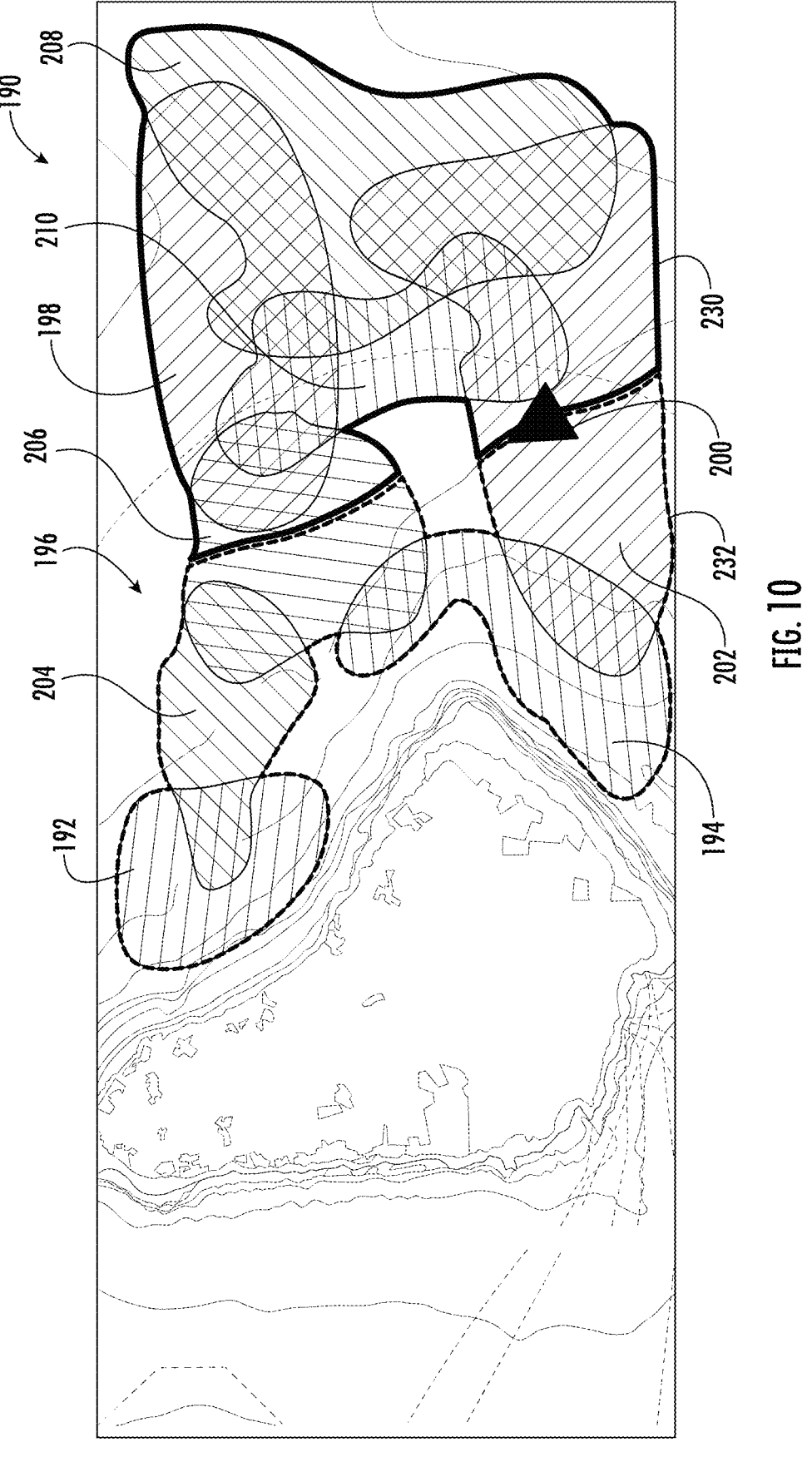
FIG. 10 is the chart of FIGS. 7 and 9 with the combined region bisected into a first region and a second region, in accordance with some embodiments discussed herein.

FIG. 10 shows a bisection of the region 196 into a first region 232 and a second region 230, which may be the first step in determining a navigation path within the region 196. The bisection of the region 196 may be performed in one of various ways. For example, in some embodiments, the region 196 may be bisected based on a shape of the region 196 and/or based on a determined location of the watercraft. Further, the region 196 may be bisected according to surface area, and in other embodiments, the region 196 may be bisected according to a line drawn from the watercraft in a direction that the watercraft is currently aimed. Further, the bisection of the region 196 may be performed in any other way. Moreover, in some embodiments, the region 196 may be divided into more than two regions, or in some other embodiments, the region 196 may not be divided at all.

Figure 11:
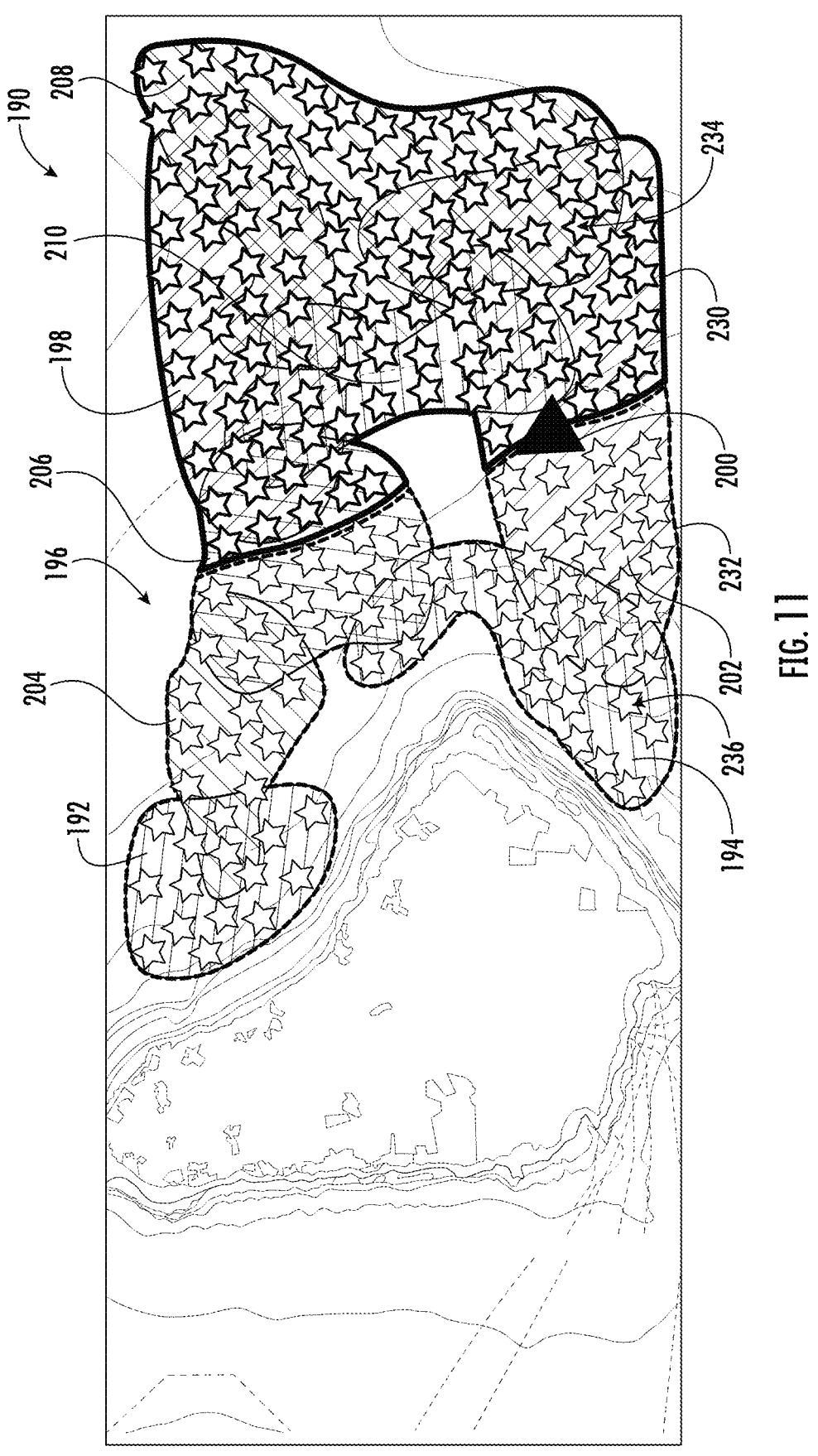
FIG. 11 is the chart of FIGS. 7 and 9-10 with a plurality of first potential destinations demonstrated overtop the first region and a plurality of second potential destinations demonstrated overtop the second region, in accordance with some embodiments discussed herein.

FIG. 11 shows the region 196 bisected into the first region 232 and the second region 230, with a plurality of first potential destinations 236 overtop the chart 190 and a plurality of second potential destinations 234 also overtop the chart 190. The plurality of first potential destinations 236 and the plurality of second potential destinations 234 may be based on the region 196 which has been bisected into the first region 232 and the second region 230. In some embodiments, the plurality of first potential destinations 236 may include an infinite (or almost infinite) amount of first potential destinations, and the plurality of second potential destinations 234 may include an infinite (or almost infinite) amount of second potential destinations. Any other number of potential destinations within each of the first region 230 and the second region 232 are contemplated. Further, the plurality of first potential destinations 236 and the plurality of second potential destinations 234 may be determined based on any factor (e.g., infinite destinations may be considered, or destinations may be considered which are within a certain distance (e.g., 1 foot) of each other). Other determination factors are also contemplated.

Figure 12:
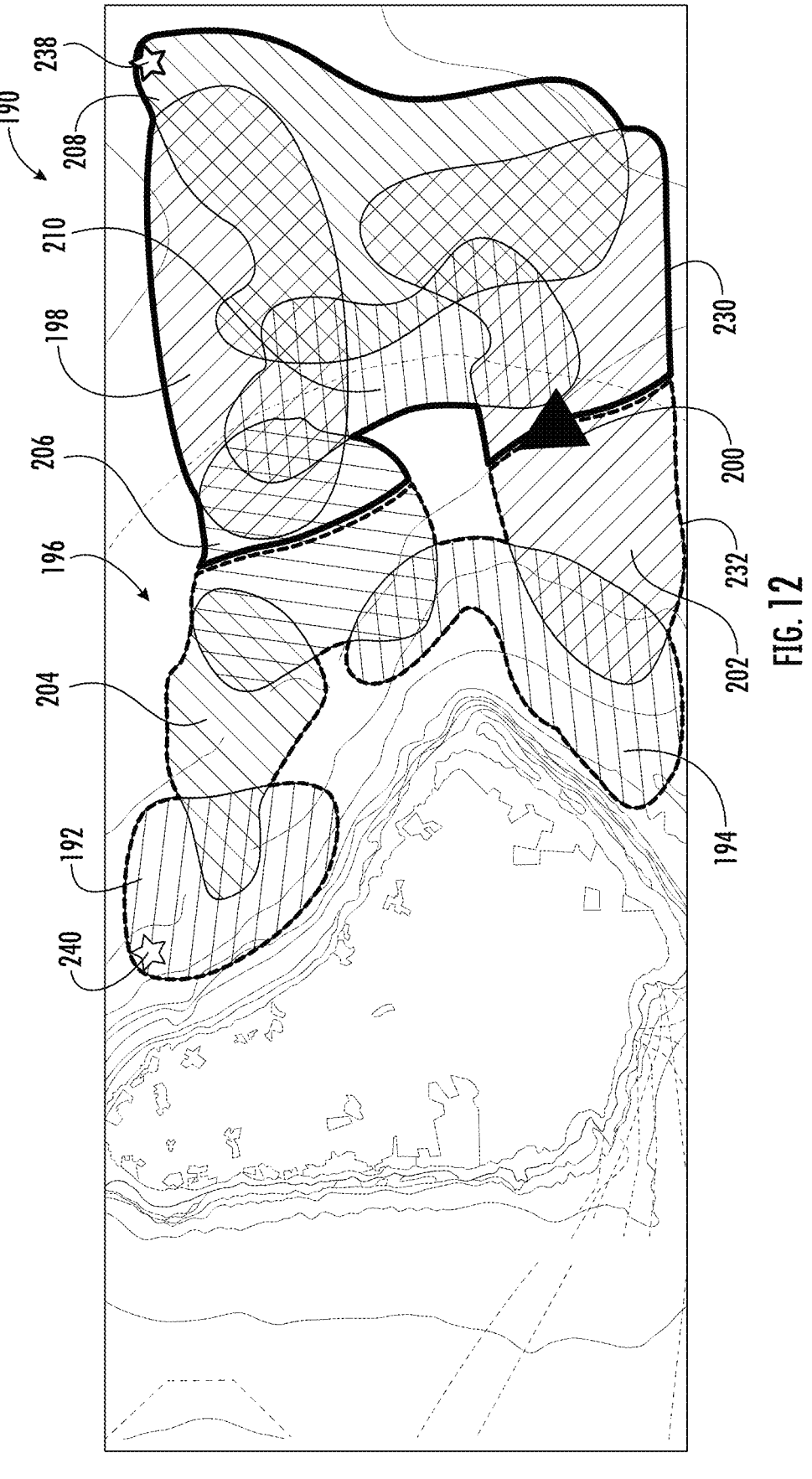
FIG. 12 is the chart of FIGS. 7 and 9-11 with a first potential destination shown as selected within the first region and a second potential destination shown as selected within the second region, in accordance with some embodiments discussed herein.

FIG. 12 shows a first potential destination 240 that has been selected from the plurality of first potential destinations 236 within the first region 232 and a second potential destination 238 selected from the plurality of second potential destinations 234 within the second region 230. The first potential destination 240 and the second potential destination 238 may be selected based on one or more of a variety of reasons. For example, the first potential destination 240 and the second potential destination 238 may each be selected based on a distance from that watercraft being the greatest. Additionally or alternatively, the first potential destination 240 and the second potential destination 238 may each be selected based on a direction in which the first potential destination 240 and/or the second potential destination 238 each being desirable individually and/or desirable with respect to each other (e.g., a processor may choose the first potential destination 240 as being a potential destination with a greatest distance from the watercraft and then may choose the second potential destination 238 as being a potential destination with a greatest distance from the watercraft in a direction that is opposite from a direction pointing from the watercraft to the first potential destination 240). Other selection methods are also contemplated.

Figure 13:
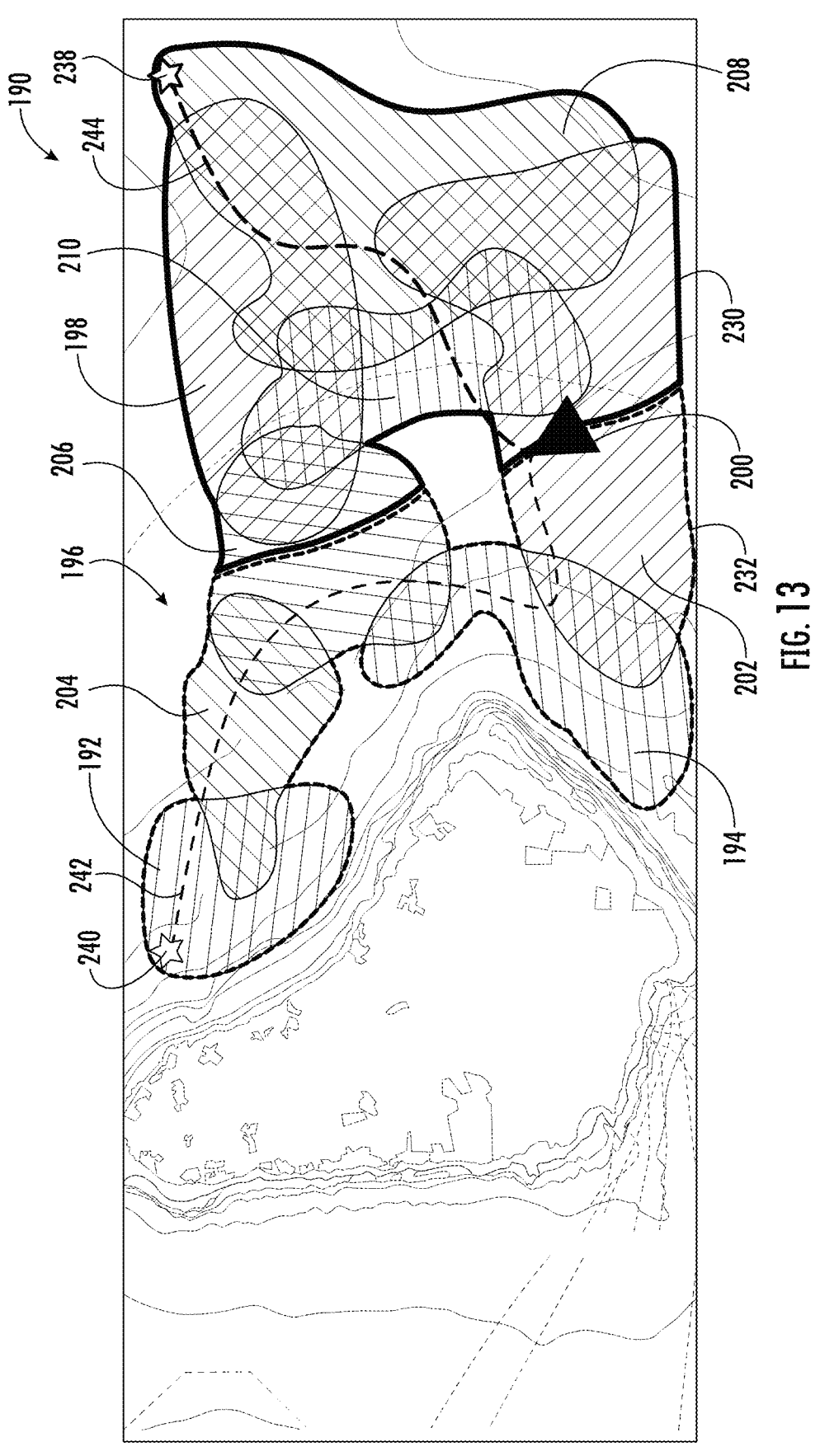
FIG. 13 is the chart of FIGS. 7 and 9-12 with a first potential path illustrated within the first region, which leads to the first potential destination, and a second potential path illustrated within the second region, which leads to the second potential destination, in accordance with some embodiments discussed herein.

FIG. 13 shows a first potential path 242 that has been determined that leads to the first potential destination 240 and a second potential path 244 that has been determined that leads to the second potential destination 238. The processor may execute a first algorithm using the first potential destination 240 to determine the first potential path 242 where each part of the first potential path 242 is within the determined region 196. Similarly, the processor may execute a second algorithm using the second potential destination 238 to determine the second potential path 244 where each part of the second potential path 244 is within the determined region 196. In some embodiments, the first algorithm and the second algorithm may be A*algorithms, which are environmentally informed path planning algorithms that search for a best path (e.g., based on criteria such as least distance, etc.). In some other embodiments, the first algorithm and the second algorithm may be RRT algorithms (which are algorithms for rapid searching of high dimensional spaces that essentially sub-sample data randomly to estimate where clear paths are), D*algorithms (which are algorithms that account for new obstacles without having to recalculate all data in memory), any other types of algorithms, or any combination thereof. Further, in some embodiments, the first and second algorithms may be developed using an artificial intelligence model, as will be described in more detail herein. Other algorithm methods are also contemplated.

Figure 14:
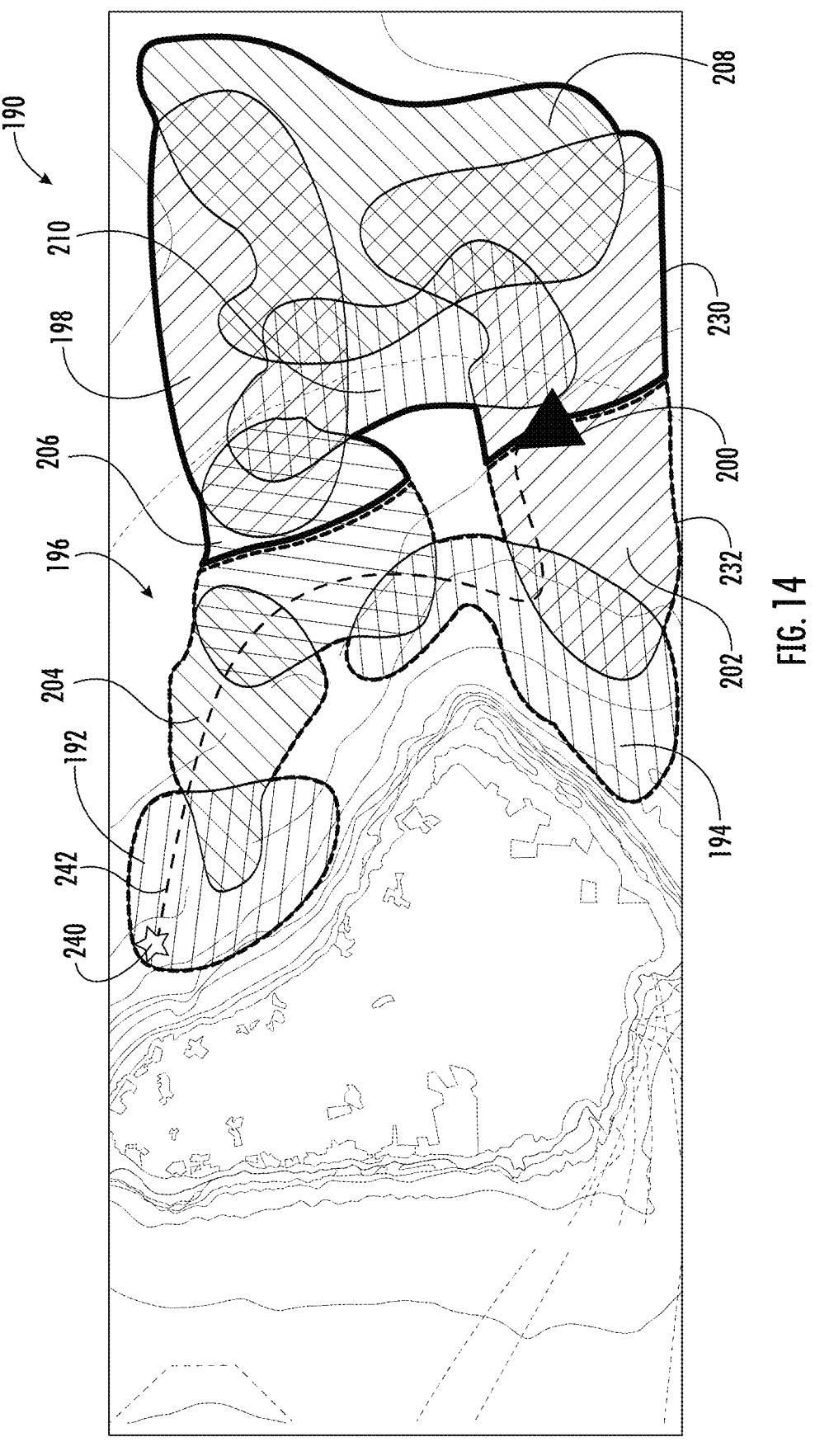
FIG. 14 is the chart of FIGS. 7 and 9-13 with the first potential path shown as a selected navigation path within the combined region, in accordance with some embodiments discussed herein.

FIG. 14 shows the first potential path 242, which leads to the first potential destination 240, as being selected as the navigation path. The processor may, in some embodiments, cause a screen to display the navigation path overtop a chart on the screen. The processor may also cause the watercraft to travel along the navigation path using, e.g., an autopilot navigation assembly. In some embodiments, the autopilot navigation assembly may be configured to travel along the navigation path for a predetermined distance and/or until one or more triggers occur. Upon the occurrence of a predetermined distance being traveled and/or a trigger occurring, or any other prompt, the processor may be configured to recalculate the navigation path such that a continuous navigation path is determined indefinitely. Further, the continuous path may be repeatedly updated in accordance with predetermined intervals defined by periods of time, distance, or any other metric. That is, because constraint relaxation techniques are being used to form indefinite data sets to optimize the navigation path, and because a potential navigation path is being chosen through that process, a better continuous path can be developed by continually updating and/or repeating the process to obtain new potential destinations and new potential paths. This allows for the destination of the selected navigation path, and the navigation path, to continually change such that the watercraft remains in areas with the most optimal condition parameters.

For example, in the ongoing example, an autopilot navigation assembly may cause the watercraft to travel along the first potential path 242 for a predetermined interval (e.g., for 5 minutes and/or for 100 feet). The processor may then enter into an intermediary determination of an updated navigation path such that the path remains continuous indefinitely and such that the watercraft remains in areas that are closest to conditions with winds between 10 and 15 knots, optimal tide conditions, and depths between 3 and 5 feet, as dictated by the original set of condition parameters. The processor may, however, in some embodiments, allow for additional condition parameters to be incorporated, and/or it may allow for removal or alteration of current condition parameters. This may be based on user input and/or on recommendations generated by an artificial intelligence model, as will be described in more detail herein (or based on any other information or input).

Figure 15:
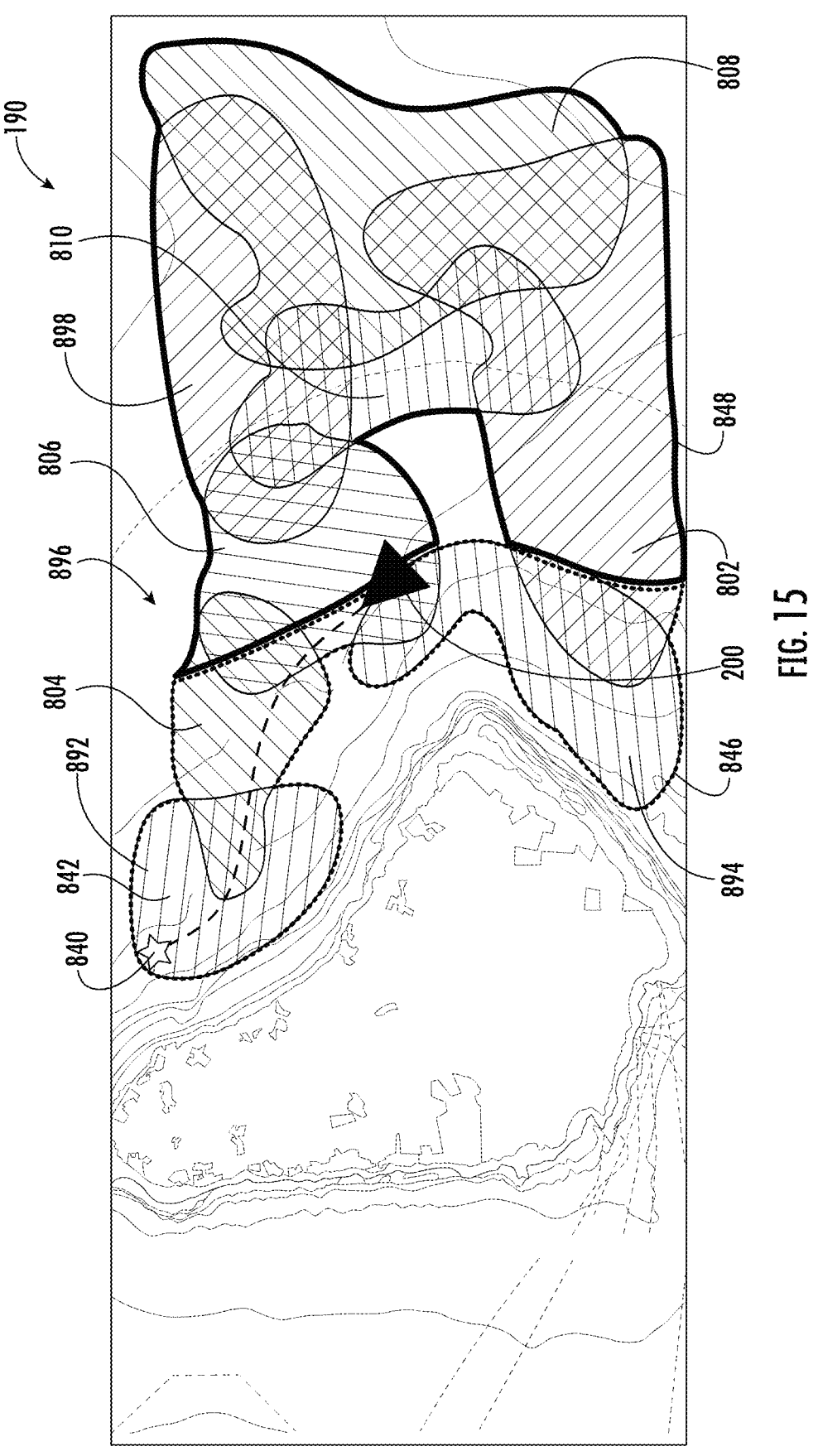
FIG. 15 is the chart of FIGS. 7 and 9-14 with the icon indicating the position of the watercraft having moved along the selected navigation path and with the combined region bisected into a third region and a fourth region, in accordance with some embodiments discussed herein.

FIG. 15 shows the icon 200 representing the watercraft on the chart 190 having moved along the navigation path 842, which was the first potential path 242 selected as being the navigation path in the process described with respect to FIG. 14. The chart 190 includes a first highlighted region 892, a second highlighted region 894, a third highlighted region 898, a fourth highlighted region 804, a fifth highlighted region 806, a sixth highlighted region 810, a seventh highlighted region 808, and an eighth highlighted region 802, all of which make up a region 896. The first, second, third, fourth, fifth, sixth, seventh, and eighth highlighted regions 892, 894, 898, 804, 806, 810, 808, and 802 represent areas in which all of the condition parameters, plus the constraint relaxed condition parameter(s) are met. In some embodiments, the same constraint relaxed condition parameters may be used, but in other embodiments, new constraint relaxed condition parameters may be generated. That is, the processor may determine that the new region being considered does not need a constraint relaxation to be determined and applied onto a condition parameter anymore because the entire region meets the original condition parameter. The processor would then go through the entire process described above with respect to FIGS. 7-14 to determine an updated navigation path, starting with the original set of condition parameters and any other condition parameters determined based on, e.g., user input or an artificial intelligence model. However, in other embodiments, the processor may determine that the region being considered has not changed significantly and may continue to use the calculations of the constraint relaxed condition parameters until a more significant change has occurred.

For example, in the ongoing example, previous condition parameters may be either carried over or recalculated, and the first, second, third, fourth, fifth, sixth, seventh, and eighth highlighted regions 892, 894, 898, 804, 806, 810, 808, and 802 may represent areas on the chart 190 in which the wind conditions are between 0 and 18 knots, the tide conditions are favorable, and the depth is between 2.2 and 5.8 feet. Notably, the first, second, third, fourth, fifth, sixth, seventh, and eighth highlighted regions 892, 894, 898, 804, 806, 810, 808, and 802 provide various opportunities for paths to be created that extend a predetermined distance from the watercraft (which is represented by icon 200). Thus, the processor may determine that no more constraint relaxations need to be determined and applied. In some embodiments, the processor may make such a determination based on the highlighted regions being continuous for a predetermined distance from the watercraft. In other embodiments, however, the determination as to whether a constraint relaxation needs to be made may be made in different ways.

FIG. 15 further shows a bisection of the region 896 into a third region 846 and a fourth region 848, which may be the first step in determining an updated navigation path within the region 896. The bisection of the region 896 may be performed in one of various ways. For example, in some embodiments, the region 896 may be bisected based on a shape of the region 896 and/or based on a determined location of the watercraft. Further, the region 896 may be bisected according to surface area, and in other embodiments, the region 896 may be bisected according to a line drawn from the watercraft in a direction that the watercraft is currently aimed. Further, the bisection of the region 896 may be performed in any other way. Moreover, in some embodiments, the region 896 may be divided into more than two regions, or in some other embodiments, the region 896 may not be divided at all.

FIG. 16 shows the region 896 bisected into the third region 846 and the fourth region 848, with a plurality of third potential destinations 850 overtop the chart 190 and a plurality of fourth potential destinations 852 also overtop the chart 190. The plurality of third potential destinations 850 and the plurality of fourth potential destinations 852 may be based on the region 896 which has been bisected into the third region 846 and the fourth region 848. In some embodiments, the plurality of third potential destinations 850 may include an infinite (or almost infinite) amount of third potential destinations, and the plurality of fourth potential destinations 852 may include an infinite (or almost infinite) amount of fourth potential destinations. Any other number of potential destinations within each of the third region 846 and the fourth region 848 are contemplated. Further, the plurality of third potential destinations 850 and the plurality of fourth potential destinations 852 may be determined based on any factor (e.g., infinite destinations may be considered, or destinations may be considered which are within a certain distance (e.g., 1 foot) of each other). Other determination factors are also contemplated.

FIG. 17 shows a third potential destination 856 that has been selected from the plurality of third potential destinations 850 within the third region 846 and a fourth potential destination 854 selected from the plurality of fourth potential destinations 852 within the fourth region 848. The third potential destination 856 and the fourth potential destination 854 may be selected based on one or more of a variety of reasons. For example, the third potential destination 856 and the fourth potential destination 854 may each be selected based on a distance from that watercraft being the greatest. Additionally or alternatively, the third potential destination 856 and the fourth potential destination 854 may each be selected based on a direction in which the third potential destination 856 and/or the fourth potential destination 854 each being desirable individually and/or desirable with respect to each other (e.g., a processor may choose the third potential destination 856 as being a potential destination with a greatest distance from the watercraft and then may choose the fourth potential destination 854 as being a potential destination with a greatest distance from the watercraft in a direction that is opposite from a direction pointing from the watercraft to the third potential destination 856). Other selection methods are also contemplated.

Once the third potential destination 856 and the fourth potential destination 854 have been selected, the processor may, in some embodiments, decide to discard one of the third potential destination 856 or the fourth potential destination 854 based on the watercraft already traveling in a certain direction according to the navigation path 842. For example, since the fourth potential destination 854 is closer to the watercraft icon 200 than the third potential destination 856 when factoring in the direction in which the watercraft icon 200 is already traveling, which is along the navigation path 842, the processor may decide for efficiency purposes or otherwise to discard the third potential destination 856 and then proceed with only the fourth potential destination 854. In other embodiments, however, both the third potential destination 856 and the fourth potential destination 854 may both be considered, and the processor may not discard either of them.

FIG. 18 shows a third potential path 858 that has been determined that leads to the third potential destination 856 and a fourth potential path 860 that has been determined that leads to the fourth potential destination 854. The processor may execute a third algorithm using the third potential destination 856 to determine the third potential path 858 where each part of the third potential path 858 is within the determined region 896. Similarly, the processor may execute a fourth algorithm using the fourth potential destination 854 to determine the fourth potential path 860 where each part of the fourth potential path 860 is within the determined region 896. In some embodiments, the third algorithm and the fourth algorithm may be A*algorithms, which are environmentally informed path planning algorithms that search for a best path (e.g., based on criteria such as least distance, etc.). In some other embodiments, the third algorithm and the fourth algorithm may be RRT algorithms (which are algorithms for rapid searching of high dimensional spaces that essentially sub-sample data randomly to estimate where clear paths are), D*algorithms (which are algorithms that account for new obstacles without having to recalculate all data in memory), any other types of algorithms, or any combination thereof. Further, in some embodiments, the third and fourth algorithms may be developed using an artificial intelligence model, as will be described in more detail herein. Other algorithm methods are also contemplated. Again, as described herein, in some embodiments, the third potential path 858 may not be generated at all if the third potential destination 856 is discarded.

FIG. 19 shows the watercraft icon 200 traveling along the previous navigation path 842. The third potential navigation path 858 that led to the third potential destination 856 has been discarded in favor of the fourth potential path 860 that leads to the fourth potential destination 854, and the fourth potential path 860 has been updated by the processor to form the updated fourth potential path 862. The updated fourth potential path 862 is a combination of the original fourth potential path 860 and the previous navigation path 842 such that the updated fourth potential path is more favorable for the watercraft considering the path and direction in which the watercraft is already traveling. Although this step is included in the ongoing example, this step is completely optional. That is, in some embodiments, the fourth potential path 860 may be used without being updated, and the processor may choose between the third potential path 858 (in embodiments in which it is not discarded), the fourth potential path 860, and the original navigation path 842, without any additional updating or optimization steps.

FIG. 20 shows the updated fourth potential path 862, which leads to the fourth potential destination 854, as being selected as the updated navigation path. This selection may be made based on any factor. For example, the updated fourth potential path 862 may be chosen simply because it is longer than the original navigation path 842, or it may be chosen because more of the instances along the updated fourth potential path 862 are within the original set of conditions parameters (e.g., before constraint relaxation) than are the instances along the original navigation path 842. The selection may be made in any other way with any other information. The processor may, in some embodiments, cause a screen to display the navigation path overtop a chart on the screen. The processor may also cause the watercraft to travel along the navigation path using, e.g., an autopilot navigation assembly. In some embodiments, the autopilot navigation assembly may be configured to travel along the navigation path for a predetermined distance and/or until one or more triggers occur. Upon the occurrence of a predetermined distance being traveled and/or a trigger occurring, or any other prompt, the processor may be configured to recalculate the navigation path such that a continuous navigation path is determined indefinitely. Further, the continuous path may be repeatedly updated in accordance with predetermined intervals defined by periods of time, distance, or any other metric. That is, because constraint relaxation techniques are being used to form indefinite data sets to optimize the navigation path, and because a potential navigation path is being chosen through that process, a better continuous path can be developed by continually updating and/or repeating the process to obtain new potential destinations and new potential paths. This allows for the destination of the selected navigation path, and the navigation path, to continually change such that the watercraft remains in areas with the most optimal condition parameters.

For example, in the ongoing example, an autopilot navigation assembly may cause the watercraft to travel along the updated fourth potential path 862 for a predetermined interval (e.g., for 5 minutes and/or for 100 feet). The processor may then enter into another intermediary determination of an updated navigation path such that the path remains continuous indefinitely and such that the watercraft remains in areas that are closest to conditions with winds between 10 and 15 knots, optimal tide conditions, and depths between 3 and 5 feet, as dictated by the original set of condition parameters. The processor may, however, in some embodiments, allow for additional condition parameters to be incorporated, and/or it may allow for removal or alteration of current condition parameters. This may be based on user input and/or on recommendations generated by an artificial intelligence model, as will be described in more detail herein (or based on any other information or input). The process may be continuous such that the navigation path is always being updated in accordance with the predetermined intervals.

FIG. 21 is a diagram that outlines the process exemplified and described above with respect to FIGS. 7-20. The process includes an initial determination 600 of a navigation path on the left and an intermediary determination 602 of a navigation path on the right. The initial determination 600 describes the initial path creation process exemplified above with respect to FIGS. 7-14, and the intermediary determination 602 describes the intermediary path updating process exemplified above with respect to FIGS. 15-20.

The initial determination 600 may include a definition of a region at operation 602 and then a bisection of the region at operation 604. At operation 606, the initial determination 600 may include finding a potential destination in each bisected region that represents, e.g., the greatest distance solution in that bisected region. For example, the greatest distance solution may be configured to, in some embodiments, determine a most distant (reachable) point in the region. This may be performed in two different "directions" such that there are two potential destinations to select from. Then, at operation 608, the initial determination 600 may apply an algorithm to each potential destination to determine a potential path that corresponds to each potential destination. The algorithm(s) may be an A*algorithm, a D*algorithm, a RRT algorithm, any other type of navigation routing algorithm, or any combination thereof. For example, in some embodiments, the algorithm(s) applied at operation 608 may determine a shortest path to the potential destinations that were determined at operation 606. The initial determination 600 may then choose a path for the watercraft to initially travel along at operation 610.

The intermediary determination 602 may then begin with the same region or by determining a new region, as described herein, and then may include bisecting the region at operation 612. At operation 614, the intermediary determination 602 may include finding a potential destination in each bisected region that represents, e.g., the greatest distance solution in that bisected region. For example, the greatest distance solution may be configured to, in some embodiments, determine a most distant (reachable) point in the region. This may be performed in two different "directions" such that there are two potential destinations to select from. At operation 616, the intermediary determination 602 may eliminate one or more potential destinations that are not "forward looking." In other words, the intermediary determination 602 may eliminate potential destinations that are not in the general direction in which the watercraft is already traveling at operation 616. Notably, operation 616 may be optional in some embodiments. Operation 618 may include applying an algorithm to each remaining potential destination to determine potential paths corresponding to each remaining potential destination. Further, operation 620 may include choosing a path from the determined potential path(s) and the previously determined path (e.g., the path determined at operation 610 in the initial determination 600). Then, optionally, if the chosen path is different from the previously determined path, the intermediary determination 602 may combine the chosen path with the previously chosen path at operation 622. The processor may then repeat the intermediary determination 602 continuously until, e.g., the continuous path generation system is terminated by a user or other system.

Example Use of Artificial Intelligence

FIG. 22 is a flowchart of an example method 700 of machine learning, such as may be utilized with artificial intelligence for various embodiments of the present invention. At least one processor or another suitable device may be configured to develop a model for, e.g., the determination of a set of condition parameters and/or determination of constraint relaxation(s), among other determinations, such as described herein in various embodiments. In this regard, the developed model may be deployed and utilized to determine a set of condition parameters and/or one or more constraint relaxation(s) for a processor such as described herein. Other determinations may also be made using the developed model as well, as described and referred to herein. In some embodiments, a marine electronic device may comprise one or more processors that perform the functions shown in FIG. 22.

This system may beneficially determine the set of condition parameters and/or the constraint relaxation(s) by accounting for different types of vessel data, as well as additional data that may come from external sources, and the developed model may assign different weights to different types of data that are provided. In some systems, even after the model is deployed, the systems may beneficially improve the developed model by analyzing further data points. By utilizing artificial intelligence, a novice user may benefit from the experience of the models utilized, making marine activities more user friendly and accessible/successful for beginners. Embodiments beneficially allow for accurate information to be provided about the watercraft and/or the desired conditions or activity (e.g., fishing style and/or fish type) and may also allow for such information to be optimized so that the user may make well-informed decisions. Utilization of the model may prevent the need for a user to spend a significant amount of time reviewing information, freeing the user to perform other tasks and enabling performance and consideration of complex estimations and computations that the user could not otherwise solve on their own (e.g., the systems described herein may also be beneficial for even the most experienced users). Further, utilization of the model may enable a novice user who would otherwise not know how to select condition parameters to operate with optimal condition parameters for a simple user input.

By receiving several different types of data, the example method 700 may be performed to generate complex models. The example method 700 may find relationships between different types of data that may not have been anticipated. By detecting relationships between different types of data, the method 700 may generate accurate models even where a limited amount of data is available.

In some embodiments, the model may be continuously improved even after the model has been deployed. Thus, the model may be continuously refined based on changes in the systems or in the environment over time, which provides a benefit as compared with other models that stay the same after being deployed. The example method 700 may also refine the deployed model to fine-tune weights that are provided to various types of data based on subtle changes in the watercraft and/or the environment. Where certain parts of the watercraft are replaced, modified, or damaged or where there are swift changes in the environment, the method 700 may continuously refine a deployed model to quickly account for the changes and provide a revised model that is accurate. By contrast, where a model is not continuously refined, changes to the watercraft or the surrounding environment may make the model inaccurate until a new model may be developed and implemented, and implementation of a new model may be very costly, time-consuming, and less accurate than a continuously refined model.

At operation 702, one or more data points are received. These data points may or may not be the initial data points being received through user input. These data points preferably comprise known data on, e.g., a preferred fishing style, a preferred fish type, a preferred depth or depth range, or some other indication that the model may be used to predict. For example, where the model is being generated to provide a set of condition parameters, the data points provided at operation 702 will preferably comprise known data that corresponds to a desired mode or a preferred operating condition. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, the model predicted set of condition parameters, calculated constraint relaxation(s), and/or other determinations may be formed based on historical comparisons of data.

For example, the model may be formed based on historical comparisons of various types of condition parameters with historical data, and a processor may be configured to utilize the developed model to determine an estimated constraint relaxation recommendation based on determined flexibilities, criticalities, and other assessments of the various types of condition parameters. This model may be developed through machine learning utilizing artificial intelligence based on the historical comparisons of the historical data associated with each of the condition parameters being considered, among other information from external data sources. Alternatively, a model may be developed through artificial intelligence, and the model may be formed based on historical comparisons of the data and additional data. A processor may be configured to use the model and input the data into the model to determine the constraint relaxation recommendation.

Another example of appropriate historical comparisons may include comparing additional data (e.g., geographical data from maps or nautical charts, temperature data, time data, etc.) with condition parameter data. Additional data may be provided from a variety of sources, and additional data may, for example, be provided from a camera, a radar, a thermometer, a clock, a pressure sensor, a direction sensor, or a position sensor.

At operation 704, a model is improved by minimizing error between a predicted output generated by the model and an actual output for data points. In some embodiments, an initial model may be provided or selected by a user. The user may provide a hypothesis for an initial model, and the method 700 may improve the initial model. However, in other embodiments, the user may not provide an initial model, and the method 700 may develop the initial model at operation 704, such as during the first iteration of the method 700. The process of minimizing error may be similar to a linear regression analysis on a larger scale where three or more different variables are being analyzed, and various weights may be provided for the variables to develop a model with the highest accuracy possible. Where a certain variable has a high correlation with the actual output, that variable may be given increased weight in the model. For example, where data from maps or nautical charts are available, that data may be provided alongside with user input, and the model may be optimized to give the map data its appropriate weight. In refining the model by minimizing the error between the predicted output generated by the model and the actual or known output, the component performing the method 700 may perform a very large number of complex computations. Sufficient refinement results in an accurate model.

In some embodiments, the accuracy of the model may be checked. For example, at operation 706, the accuracy of the model is determined. This may be done by calculating the error between the model predicted output generated by the model and the actual output from the data points. In some embodiments, error may also be calculated before operation 704. By calculating the accuracy or the error, the method 700 may determine if the model needs to be refined further or if the model is ready to be deployed. Where the output is a qualitative value or a categorical value, the accuracy may be assessed based on the number of times the predicted value was correct. Where the output is a quantitative value, the accuracy may be assessed based on the difference between the actual value and the predicted value.

At operation 708, a determination is made as to whether the calculated error is sufficiently low. A specific threshold value may be provided in some embodiments. For example, where an output is a depth, the threshold may be 0.1 meters, and the calculated error may be sufficiently low if the average error is less than or equal to 0.1 meters. However, other threshold values may be used, and the threshold value may be altered by the user in some embodiments. If the error rate is not sufficiently low, then the method 700 may proceed back to operation 702 so that one or more additional data points may be received. If the error rate is sufficiently low, then the method 700 proceeds to operation 710. Once the error rate is sufficiently low, the training phase for developing the model may be completed, and the implementation phase may begin where the model may be used to predict the expected output.

By completing operations 702, 704, 706, and 708, a model may be refined through machine learning utilizing artificial intelligence based on the historical comparisons of data and based on known deviations of the data for the historical comparisons. Notably, example model generation and/or refinement may be accomplished even if the order of these operations is changed, if some operations are removed, or if other operations are added.

During the implementation phase, the model may be utilized to provide a set of condition parameters and/or one or more constraint relaxation condition parameter(s). An example implementation of a model is illustrated from operations 710-712. In some embodiments, the model may be modified (e.g., further refined) based on the received data points, such as at operation 714.

At operation 710, further data points are received. For these further data points, the output may not be known. At operation 712, the model may be used to provide a predicted output data value for the further data points. Thus, the model may be utilized to determine the output.

At operation 714, the model may be modified based on supplementary data points, such as those received during operation 710 and/or other data points. For example, the model may be refined utilizing the data and the determined output(s), such as described herein. By providing supplementary data points, the model can continuously be improved even after the model has been deployed. The supplementary data points may be the further data points received at operation 710, or the supplementary data points may be provided to the processor from some other source. In some embodiments, the processor(s) or other component performing the method 700 may receive additional data from secondary devices and verify the further data points received at operation 710 using this additional data. By doing this, the method 700 may prevent errors in the further data points from negatively impacting the accuracy of the model.

In some embodiments, supplementary data points are provided to the processor from some other source and are utilized to improve the model. For example, supplementary data points may be saved to a memory 308 (FIG. 23) associated with at least one processor 304 via communication interface 310, or the supplementary data points may be sent through the external network 318 from a remote device 320. These supplementary data points may be verified before being provided to the at least one processor 304 to improve the model, or the at least one processor 304 may verify the supplementary data points utilizing additional data.

As indicated above, in some embodiments, operation 714 is not performed and the method proceeds from operation 712 back to operation 710. In other embodiments, operation 714 occurs before operation 712 or simultaneous with operation 712. Upon completion, the method 700 may return to operation 710 and proceed on to the subsequent operations. Supplementary data points may be the further data points received at operation 710 or some other data points.

Example System Architecture

FIG. 23 shows a block diagram of an example system 300 capable for use with several embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device 302 (e.g., controller) and various sensors/system.

The marine electronics device 302, controller, remote control, MFD, and/or user interface display may include a processor 304, a memory 308, a communication interface 310, a user interface 312, a display 314, and one or more sensors (e.g., other sensors 316 which may be in the marine electronics device 302 or otherwise operatively connected (e.g., wired or wirelessly)). In some embodiments, the processor 304 may include an autopilot navigation assembly.

In some embodiments, the system 300 may be configured to receive, process, and display various types of marine data. Additionally, the system 300 may include one or more components that are configured to gather marine data or perform marine features. In such a regard, the processor 304 may be configured to process the marine data and generate one or more images corresponding to the marine data for display on the screen that is integrated in the marine electronics device 302. Further, the system 300 may be configured to communicate with various internal or external components (e.g., through the communication interface 310), such as to provide instructions related to the marine data.

The processor 304 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 304 as described herein. In this regard, the processor 304 may be configured to analyze electrical signals communicated thereto to provide display data to the display.

The memory 308 may be configured to store instructions, computer program code, marine data (e.g., sonar data, chart data, location/position data, sensor data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 310 may form a processing circuitry/communication interface. The communication interface 310 may be configured to enable connections to external systems (e.g., an external network 318 or one or more remote controls, such as a handheld remote control, marine electronics device, foot pedal, or other remote computing device). In this regard, the communication interface (e.g., 310) may include one or more of a plurality of different communication backbones or frameworks, such as Ethernet, USB, CAN, NMEA 2000, GPS, Sonar, cellular, WiFi, and/or other suitable networks, for example. In this manner, the processor 304 may retrieve stored data from a remote, external server via the external network 318 in addition to or as an alternative to the onboard memory 308. Numerous other peripheral, remote devices such as one or more wired or wireless multi-function displays may be connected to the system 300.

The processor 304 may configure the device and/or circuitry to perform the corresponding functions of the processor 304 as described herein. In this regard, the processor 304 may be configured to analyze electrical signals communicated thereto to provide, for example, various features/functions described herein.

In some embodiments, the system 300 may be configured to determine the location of the marine vessel, such as through a location sensor 324. The system 300 may comprise, or be associated with, a navigation system that includes the location sensor 324. For example, the location sensor 324 may comprise a GPS, bottom contour, inertial navigation system, such as a micro-electro-mechanical system (MEMS) sensor, a ring laser gyroscope, or the like, or other location detection system. In such a regard, the processor 304 may be configured to act as a navigation system. For example, the processor 304 may generate at least one navigation path and, in some cases, generate an image of a chart along with the navigation path for display by the screen. The location of the vessel and/or routes may be displayed on a navigation chart on a display remote from the system 300. Further, additional navigation features (e.g., providing directions, weather information, etc.) are also contemplated.

In any of the embodiments, the display 314 may be configured to display an indication of the current direction of the marine vessel.

The display 314 may be configured to display images and may include or otherwise be in communication with a user interface 312 configured to receive input from a user. The display 314 may be, for example, a conventional liquid crystal display (LCD), LED/OLED display, touchscreen display, mobile media device, and/or any other suitable display known in the art, upon which images may be displayed. In some embodiments, the display 314 may be the MFD and/or the user's mobile media device. The display may be integrated into the marine electronic device 302. In some example embodiments, additional displays may also be included, such as a touch screen display, mobile media device, or any other suitable display known in the art upon which images may be displayed.

In some embodiments, the display 314 may present one or more sets of marine data and/or images generated therefrom. Such marine data may include chart data, radar data, weather data, location data, position data, orientation data, sonar data, and/or any other type of information relevant to the marine vessel. In some embodiments, the display 314 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 314 and/or user interface 312 may be a screen that is configured to merely present images and not receive user input. In other embodiments, the display and/or user interface may be a user interface such that it is configured to receive user input in some form. For example, the screen may be a touchscreen that enables touch input from a user. Additionally or alternatively, the user interface may include one or more buttons (not shown) that enable user input.

Additionally, the display 314 may be configured to display other relevant information including, but not limited to, speed data, motor data battery data, current operating mode, auto pilot, or the like. For example, in some example embodiments, the system 300 may include a continuous navigation mode. The processor 304 may receive an indication of the current location of the watercraft and the current and/or desired conditions of the environment and generate display data accordingly. In an example embodiment, the generated display data may be manipulated by user input. For example, the processor 304 may receive data from the user input device 304, the location sensor 324, the external network 318, and/or the other sensors 316. The received data may comprise user input indicating a desired mode and/or one or more desired conditions. Additionally, or alternatively, the received data may comprise information regarding current and/or desired conditions of the surrounding environment. The processor 304 may then determine a set of condition parameters and, when necessary, determine and apply constraint relaxation(s) to one or more of the condition parameters within the set of condition parameters. Additionally, or alternatively, the processor 304 may determine continuous navigation path(s) that keep the watercraft within the set of condition parameters, after the constraint relaxation(s) (if applicable), such that the watercraft continues within the desired conditions with no preset destination.

The user interface 312 may include, for example, a keyboard, keypad, function keys, mouse, scrolling device, input/output ports, touch screen, or any other mechanism by which a user may interface with the system.

In some embodiments, the system 300 further includes a power source (e.g., battery) that is configured to provide power to the various components. In some embodiments, the power source is rechargeable. In some example embodiments, the system 300 includes a battery sensor. The battery sensor may include a current sensor or voltage sensor configured to measure the current charge of a battery power supply of the system 300 (e.g., the power source). The battery sensor may be configured to measure individual battery cells or measure a battery bank. The processor 304 may receive battery data from the battery sensor and determine the remaining charge on the battery. In an example embodiment, the voltage or current measured by the battery sensor may be compared to a reference value or data table, stored in memory 308, to determine the remaining charge on the battery.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 300 may include a computer device or system 322 (e.g., mobile media device) into which implementations of various technologies and techniques described herein may be implemented. Computing device 322 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 302 described herein may be referred to as a marine device or as an MFD. The marine electronic device 302 may include one or more components disposed at various locations on a marine vessel. Such components may include one or more data modules, sensors, instrumentation, and/or any other devices known to those skilled in the art that may transmit various types of data to the marine electronic device 302 for processing and/or display. The various types of data transmitted to the marine electronic device 302 may include marine electronics data and/or other data types known to those skilled in the art. The marine data received from the marine electronic device 302 or system 300 may include chart data, sonar data, structure data, radar data, navigation data, position data, heading data, automatic identification system (AIS) data, Doppler data, speed data, course data, or any other type known to those skilled in the art.

The marine electronic device 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 302 may be attached to various buses and/or networks, such as a National Marine Electronics Association (NMEA) bus or network, for example. The marine electronic device 302 may send or receive data to or from another device attached to the NMEA 2000 bus. For instance, the marine electronic device 302 may transmit commands and receive data from a motor or a sensor using an NMEA 2000 bus. In some implementations, the marine electronic device 302 may be capable of steering a marine vessel and controlling the speed of the marine vessel (e.g., autopilot). For instance, one or more waypoints may be input to the marine electronic device 302, and the marine electronic device 302 may be configured to steer the marine vessel to the one or more waypoints. Further, the marine electronic device 302 may be configured to transmit and/or receive NMEA 2000 compliant messages, messages in a proprietary format that do not interfere with NMEA 2000 compliant messages or devices, and/or messages in any other format. In various other implementations, the marine electronic device 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 302 may communicate with various other devices on the marine vessel via wireless communication channels and/or protocols.

In some implementations, the marine electronic device 302 may be connected to a global positioning system (GPS) receiver. The marine electronic device 302 and/or the GPS receiver may be connected via a network interface. In this instance, the GPS receiver may be used to determine position and coordinate data for a marine vessel on which the marine electronic device 302 is disposed. In some instances, the GPS receiver may transmit position coordinate data to the marine electronic device 302. In various other instances, any type of known positioning system may be used to determine and/or provide position coordinate data to/for the marine electronic device 302.

The marine electronic device 302 may be configured as a computing system similar to computing device 322.

The other sensors/systems 316 may be any other marine sensor or system, such as described herein. Examples of various other sensors/system 316 include one or more sonar systems, one or more radar systems, a trolling motor, main propulsion motor(s), pressure sensor, temperature sensor, or other devices utilized in a marine environment.

Example Flowchart(s)

Embodiments of the present disclosure provide methods for generating routes for watercrafts. Various examples of the operations performed in accordance with embodiments of the present disclosure will now be provided with reference to FIGS. 24-25.

FIG. 24 illustrates a flowchart according to an example method 400 for creating a path for a watercraft, according to various example embodiments described herein. The operations illustrated in and described with respect to FIG. 24 may, for example, be performed by, with the assistance of, and/or under the control of one or more of the components described herein, e.g., in relation to system 300.

Operation 402 may comprise determining, based on received user input, a set of condition parameters. For example, in some embodiments, operation 402 may include receiving user input directly indicating one or more of the condition parameters, and/or operation 402 may include using an artificial intelligence model to determine the set of condition parameters. The components discussed above with respect to system 300 may, for example, provide means for performing operation 402.

Operation 404 may comprise selecting at least one selected condition parameter of the set of condition parameters. In some embodiments, for example, operation 404 may include selecting the at least one condition parameter based on criticality and/or flexibility, as described herein. The components discussed above with respect to system 300 may, for example, provide means for performing operation 404.

Operation 406 may comprise determining a constraint relaxation to apply to the at least one selected condition parameter. In some embodiments, for example, operation 406 may include determining the constraint relaxation such that it increases a range of input values of the at least one selected condition parameter that satisfy the corresponding desired conditions for the potential navigation route. The components discussed above with respect to system 300 may, for example, provide means for performing operation 406.

Operation 408 may comprise applying the constraint relaxation to the at least one selected condition parameter to form a constraint relaxed condition parameter for the at least one selected condition parameter. The components discussed above with respect to system 300 may, for example, provide means for performing operation 408.

Operation 410 may include determining a region based on the determined set of condition parameters including at least the constraint relaxed condition parameter. The components discussed above with respect to system 300 may, for example, provide means for performing operation 410.

Operation 412 may include determining a navigation path within the region. In some embodiments, operation 412 may include bisecting the region based on a shape of the region and based on a determined location of the watercraft, determining a plurality of first potential destinations and a plurality of second potential destinations based on the bisected region, determining a first potential destination based on the plurality of first potential destinations, determining a second potential destination based on the plurality of second potential destinations, executing a first algorithm using the first potential destination to determine a first potential path where each part of the first potential path is within the determined region, executing a second algorithm using the second potential destination to determine a second potential path where each part of the second potential path is within the determined region, and selecting the navigation path from the first potential path and the second potential path. However, operation 412 may include determining the navigation path within the region in any other way. The components discussed above with respect to system 300 may, for example, provide means for performing operation 412.

FIG. 25 illustrates a flowchart according to an example method 500 for determining a navigation path for a watercraft based on an indefinite data set, according to various example embodiments described herein. The operations illustrated in and described with respect to FIG. 25 may, for example, be performed by, with the assistance of, and/or under the control of one or more of the components described herein, e.g., in relation to system 300.

Operation 502 may comprise determining a region based on the indefinite data set by applying a constraint relaxation to one or more groups of data within the indefinite data set until the region is continuous for a predetermined distance. For example, in some embodiments, operation 502 may include using an artificial intelligence model to optimize the region, as described herein. The components discussed above with respect to system 300 may, for example, provide means for performing operation 502.

Operation 504 may comprise bisecting the region based on a shape of the region and based on a determined location of the watercraft. In some embodiments, for example, operation 504 may include bisecting the region based on an overall surface area of the region and/or based on a direction in which the watercraft is determined to be traveling, as described herein. Other methods of bisection are also contemplated. The components discussed above with respect to system 300 may, for example, provide means for performing operation 504.

Operation 506 may comprise determining a plurality of first potential destinations and a plurality of second potential destinations based on the bisected regions. In some embodiments, for example, operation 506 may include determining an infinite (or close to infinite) amount of potential destinations within each of the bisected regions. The components discussed above with respect to system 300 may, for example, provide means for performing operation 506.

Operation 508 may comprise determining a first potential destination based on the plurality of first potential destinations. For example, operation 508 may involve determining the first potential destination based on a distance from that watercraft being the greatest and/or based on a desirable direction. Other selection methods are also contemplated. The components discussed above with respect to system 300 may, for example, provide means for performing operation 508.

Operation 510 may include determining a second potential destination based on the plurality of second potential destinations. For example, operation 510 may involve determining the second potential destination based on a distance from that watercraft being the greatest and/or based on a desirable direction. Other selection methods are also contemplated. The components discussed above with respect to system 300 may, for example, provide means for performing operation 510.

Operation 512 may include executing a first algorithm using the first potential destination to determine a first potential path. In some embodiments, the first algorithm may be an A*algorithm, an RRT algorithm, and/or a D*algorithm. In other embodiments, any other type of algorithm may be used for operation 512. The components discussed above with respect to system 300 may, for example, provide means for performing operation 512. In some embodiments, operation 512 may be optional.

Operation 514 may include executing a second algorithm using the second potential destination to determine a second potential path. In some embodiments, the second algorithm may be an A*algorithm, an RRT algorithm, and/or a D*algorithm. In other embodiments, any other type of algorithm may be used for operation 514. The components discussed above with respect to system 300 may, for example, provide means for performing operation 514. In some embodiments, operation 514 may be optional.

Operation 516 may include selecting the navigation path from the first potential path and the second potential path. For example, operation 516 may involve selecting between the first potential path and the second potential path based on a lower percentage of a path passing through regions representing condition relaxed condition parameters. In some embodiments, operation 516 may additionally involve selecting between the first potential path and the second potential path based on a path having a longer overall distance and/or having an overall direction pointing closer to a point of interest. The selection process of operation 516 may be based on any other information and/or process. The components discussed above with respect to system 300 may, for example, provide means for performing operation 516. In some embodiments, operation 516 may be optional.

FIGS. 24-25 illustrate flowcharts of systems, methods, and/or computer program products according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 308, and executed by, for example, the processor 304. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the methods for generating routes for watercrafts may include additional, optional operations, and/or the operations described above may be modified or augmented.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:
1. A system for creating a navigation path for a watercraft, comprising:
  one or more processors; and
  memory including computer executable instructions, the computer executable instructions configured to, when executed by the one or more processors, cause the one or more processors to:
    determine, based on received user input and received marine data from one or more marine sensors, a set of condition parameters including at least a first condition parameter and a second condition parameter, wherein each of the condition parameters correspond to desired conditions for a potential navigation path;
    select, based on at least one of a flexibility or a criticality of each condition parameter in the set of condition parameters, at least one condition parameter of the set of condition parameters;

determine a constraint relaxation to apply to the at least one selected condition parameter, wherein the constraint relaxation increases a range of input values of the at least one selected condition parameter that satisfy the corresponding desired conditions for the potential navigation path;

apply the constraint relaxation to the at least one selected condition parameter to form a constraint relaxed condition parameter for the at least one selected condition parameter;

determine a geographic region based on an updated determined set of condition parameters including at least the constraint relaxed condition parameter, wherein each location within the geographic region satisfies the updated determined set of condition parameters;

determine the navigation path within the geographic region using at least one computer-based path-planning algorithm; and update, based on changes to at least one of the received user input or the received marine data, the navigation path within the geographic region in accordance with predetermined intervals.

2. The system of claim 1, wherein to determine the navigation path using the at least one path-planning algorithm, the computer executable instructions are configured to, when executed by the one or more processors:

bisect the geographic region based on a shape of the geographic region and based on a determined location of the watercraft;

determine a plurality of first potential destinations and a plurality of second potential destinations based on the bisected geographic region;

determine a first potential destination based on the plurality of first potential destinations; and determine a second potential destination based on the plurality of second potential destinations.

3. The system of claim 2, wherein to determine the navigation path using the at least one path-planning algorithm, the computer executable instructions are further configured to, when executed by the one or more processors:

execute a first algorithm using the first potential destination to determine a first potential path where each part of the first potential path is within the determined geographic region;

execute a second algorithm using the second potential destination to determine a second potential path where each part of the second potential path is within the determined geographic region; and select the navigation path from among the first potential path and the second potential path.

4. The system of claim 3, wherein the first algorithm and the second algorithm are A*algorithms.

5. The system of claim 3, wherein the first algorithm and the second algorithm are RRT algorithms.

6. The system of claim 3, wherein the first algorithm and the second algorithm are D*algorithms.

7. The system of claim 3, wherein to select the navigation path from among the first potential path and the second potential path, the computer executable instructions are configured to, when executed by the one or more processors, determine which of the first potential path and the second potential path provides a greatest distance solution corresponding to a location within the geographic region that is furthest from the determined location of the watercraft.

8. The system of claim 1, wherein the computer executable instructions are configured to, when executed by the one or more processors, determine the set of condition parameters further based on at least one of environmental data, activity data, or vessel data.

9. The system of claim 1, wherein the user input indicates a desired mode, and wherein the computer executable instructions are configured to, when executed by the one or more processors, determine at least one of the first condition parameter or the second condition parameter based on the desired mode.

10. The system of claim 9, wherein the desired mode corresponds to at least one of a desired fish type or a desired fishing style.

11. The system of claim 1, wherein the navigation path is a continuous path.

12. The system of claim 11, wherein the continuous path is formed by determining a subsequent navigation path prior to completion of the prior navigation path by the watercraft.

13. A marine electronic device having one or more processors, the one or more processors being configured to:

determine, based on received user input and received marine data from one or more marine sensors, a set of condition parameters including at least a first condition parameter and a second condition parameter, wherein each of the condition parameters correspond to desired conditions for a potential navigation path;

select, based on at least one of a flexibility or a criticality of each condition parameter in the set of condition parameters, at least one condition parameter of the set of condition parameters;

determine a constraint relaxation to apply to the at least one selected condition parameter, wherein the constraint relaxation increases a range of input values of the at least one selected condition parameter that satisfy the corresponding desired conditions for the potential navigation path;

apply the constraint relaxation to the at least one selected condition parameter to form a constraint relaxed condition parameter for the at least one selected condition parameter;

determine a geographic region based on an updated determined set of condition parameters including at least the constraint relaxed condition parameter, wherein each location within the geographic region satisfies the updated determined set of condition parameters;

determine a navigation path within the geographic region using at least one computer-based path-planning algorithm; and update, based on changes to at least one of the received user input or the received marine data, the navigation path within the geographic region in accordance with predetermined intervals.

14. The system of claim 1, wherein the predetermined intervals are based on at least one of a period of time or a distance.

15. The system of claim 1, wherein to select the at least one condition parameter, the computer executable instructions are configured to, when executed by the one or more processors, rank the set of condition parameters based on the criticality of each condition parameter in the set of condition parameters.

16. The system of claim 15, wherein to select the at least one condition parameter, the computer executable instructions are configured to, when executed by the one or more processors, select a group of the set of condition parameters based on the flexibility of each condition parameter in the group of condition parameters.

17. The system of claim 16, wherein to determine the constraint relaxation, the computer executable instructions are configured to, when executed by the one or more processors, determine the constraint relaxation for the group of the set of condition parameters in order of the ranking based on the criticality of each condition parameter in the group of condition parameters.

18. The system of claim 1, wherein the set of condition parameters comprises data received from a network.

19. The system of claim 1, wherein the set of condition parameters comprises at least one of a depth minimum of the watercraft, a minimum turn radius of the watercraft, a weather condition, a tide condition, sensor data, GPS data, sonar data, radar data, marine data, or a territorial condition received from AIS.

20. The system of claim 1, wherein the one or more processors are located within a marine electronic device on the watercraft.

21. The system of claim 1, wherein the computer executable instructions are configured to, when executed by the one or more processors, cause an autopilot navigation assembly to travel along the navigation path.

22. The system of claim 1, wherein the computer executable instructions are configured to, when executed by the one or more processors, cause a screen to display the navigation path overtop a chart.

23. A method for creating a navigation path for a watercraft, the method comprising:

determining, based on received user input and received marine data from one or more marine sensors, a set of condition parameters including at least a first condition parameter and a second condition parameter, wherein each of the condition parameters correspond to desired conditions for a potential navigation path;

selecting, based on at least one of a flexibility or a criticality of each condition parameter in the set of condition parameters, at least one condition parameter of the set of condition parameters;

determining a constraint relaxation to apply to the at least one selected condition parameter, wherein the constraint relaxation increases a range of input values of the at least one selected condition parameter that satisfy the corresponding desired conditions for the potential navigation path;

applying the constraint relaxation to the at least one selected condition parameter to form a constraint relaxed condition parameter for the at least one selected condition parameter;

determining a geographic region based on an updated determined set of condition parameters including at least the constraint relaxed condition parameter, wherein each location within the geographic region satisfies the updated determined set of condition parameters;

determining the navigation path within the geographic region using at least one computer-based path-planning algorithm; and updating, based on changes to at least one of the received user input or the received marine data, the navigation path within the geographic region in accordance with predetermined intervals.

\* \* \* \* \*